(12) United States Patent
Zhang et al.

(10) Patent No.: US 12,256,246 B2
(45) Date of Patent: Mar. 18, 2025

(54) COMMUNICATION METHOD AND APPARATUS

(71) Applicant: HUAWEI TECHNOLOGIES CO., LTD., Guangdong (CN)

(72) Inventors: Meng Zhang, Shenzhen (CN); Jing Han, Beijing (CN); Hong Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 412 days.

(21) Appl. No.: 17/389,827

(22) Filed: Jul. 30, 2021

(65) Prior Publication Data

US 2021/0360455 A1 Nov. 18, 2021

Related U.S. Application Data

(63) Continuation of application No. PCT/CN2020/074190, filed on Feb. 3, 2020.

(30) Foreign Application Priority Data

Feb. 2, 2019 (CN) .......................... 201910107984.6

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2010/0267394 A1 | 10/2010 | Wu | |
| 2012/0184290 A1* | 7/2012 | Kazmi | H04W 64/00 455/456.1 |

(Continued)

FOREIGN PATENT DOCUMENTS

| | | |
|---|---|---|
| CA | 2850569 C | 3/2020 |
| CN | 101784075 A | 7/2010 |

(Continued)

OTHER PUBLICATIONS

Zhang Lifeng et al:"Dual-frequency excitation for variable gap capacitive displacement transducer",Apr. 2015, total 6 pages.

(Continued)

*Primary Examiner* — Otis L Thompson, Jr.
(74) *Attorney, Agent, or Firm* — WOMBLE BOND DICKINSON (US) LLP

(57) ABSTRACT

A communication method includes: receiving a correspondence from a network device, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1; and for one first measurement gap configuration in the N measurement gap configurations, measuring, based on the first measurement gap configuration, one or more reference signals included in a first reference signal group corresponding to the first measurement gap configuration. The correspondence between the N measurement gap configurations and the N reference signal groups is received from the network device. This avoids a technical problem that a part of reference signals cannot be measured.

18 Claims, 17 Drawing Sheets

(56) References Cited

U.S. PATENT DOCUMENTS

| | | | |
|---|---|---|---|
| 2012/0190373 A1* | 7/2012 | Tenny | H04W 56/0015 |
| | | | 455/447 |
| 2012/0307670 A1* | 12/2012 | Kazmi | H04W 24/10 |
| | | | 370/252 |
| 2014/0094188 A1* | 4/2014 | Kazmi | H04W 4/023 |
| | | | 455/456.1 |
| 2015/0071101 A1* | 3/2015 | Mager | H04W 24/10 |
| | | | 370/332 |
| 2018/0255472 A1* | 9/2018 | Chendamarai Kannan | |
| | | | H04W 72/0453 |
| 2018/0324619 A1* | 11/2018 | Harada | H04W 24/10 |
| 2019/0052996 A1* | 2/2019 | Sahai | H04W 24/10 |
| 2019/0101615 A1* | 4/2019 | Tenny | G01S 5/10 |
| 2019/0124533 A1* | 4/2019 | Tenny | H04L 5/0091 |
| 2019/0380073 A1* | 12/2019 | Martin | H04W 36/30 |
| 2019/0393970 A1* | 12/2019 | Kumar | H04B 17/345 |
| 2020/0052943 A1* | 2/2020 | Jassal | H04B 17/104 |
| 2020/0235877 A1* | 7/2020 | Manolakos | H04W 4/029 |
| 2020/0252997 A1* | 8/2020 | Sirotkin | H04W 88/10 |
| 2021/0120513 A1* | 4/2021 | Siomina | H04W 64/00 |
| 2021/0345146 A1* | 11/2021 | He | H04W 56/001 |
| 2021/0345323 A1* | 11/2021 | Axmon | H04W 72/12 |

FOREIGN PATENT DOCUMENTS

| | | |
|---|---|---|
| CN | 102271358 A | 12/2011 |
| CN | 102823286 A | 12/2012 |
| CN | 103281789 A | 9/2013 |
| CN | 105340324 A | 2/2016 |
| CN | 108810920 A | 11/2018 |
| CN | 109151922 A | 1/2019 |
| EP | 3759975 A1 | 1/2021 |
| WO | 2014087145 A1 | 6/2014 |
| WO | 2015165052 A1 | 11/2015 |
| WO | 2018031138 A1 | 2/2018 |
| WO | 2018169829 A1 | 9/2018 |
| WO | 2019161569 A1 | 8/2019 |

OTHER PUBLICATIONS

Intel Corporation, On intra-frequency measurement with gap or interruption. 3GPP TSG-RAN4 Meeting #AH1801, San Diego, CA, US, Jan. 22 26, 2018, R4-1800138, 5 pages.

Huawei, HiSilicon, Discussion on the methodology of defining the scaling factor CSFinter for inter-frequency measurements. 3GPP TSG-RAN WG4 Meeting #88, Goteborg, Sweden, August 20 24, 2018, R4-1810681, 5 pages.

3GPP TS 38.133 V15.4.0 (Dec. 2018), 3rd Generation Partnership Project; Technical Specification Group Radio Access Network; NR; Requirements for support of radio resource management(Release 15), 876 pages.

3GPP TS 38.455 V15.2.1 (Jan. 2019), 3rd Generation Partnership Project; Technical Specification Group Radio Access Network; NG-RAN; NR Positioning Protocol A (NRPPa) (Release 15), 60 pages.

3GPP TS 38.305 V15.2.0 (Dec. 2018), 3rd Generation Partnership Project; Technical Specification Group Radio Access Network; NG Radio Access Network (NG-RAN); Stage 2 functional specification of User Equipment (UE) positioning in NG-RAN(Release 15), 69 pages.

Ericsson, Way forward for NR measurement gaps. R4-179889, Sep. 22, 2017, 4 pages.

Ericsson, Scaling for measurements of multiple frequency layers with gaps. 3GPP TSG-RAN WG4 Meeting #85, Reno, USA, Nov. 27-Dec. 1, 2017, R4-1712486, 4 pages.

\* cited by examiner

COMMUNICATION METHOD AND APPARATUS

CROSS-REFERENCE TO RELATED APPLICATIONS

This application is a continuation of International Application No. PCT/CN2020/074190, filed on Feb. 3, 2020, which claims priority to Chinese Patent Application No. 201910107984.6, filed on Feb. 2, 2019. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

Usually, a terminal device can use or maintain one measurement gap configuration. Some terminal devices may use or maintain one measurement gap configuration in each frequency domain. In other words, the terminal device can measure a reference signal by using only a single measurement gap in each frequency domain.

Based on this feature that the terminal device can measure the reference signal in each frequency domain by using only the single measurement gap, if there are reference signals that occupy different time domain resources in reference signals that need to be measured by the terminal devices, a part of reference signals in the reference signals that need to be measured by the terminal device cannot be measured, and consequently signal information of a frequency or a cell corresponding to the part of reference signals cannot be learned of.

SUMMARY

Embodiments of this application provide a communication method and apparatus, so that all reference signals that need to be measured by a terminal device can be measured.

According to a first aspect, a communication method is provided. The communication method includes: receiving a correspondence from a network device, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1; and for one first measurement gap configuration in the N measurement gap configurations, measuring, based on the first measurement gap configuration, one or more reference signals included in a first reference signal group corresponding to the first measurement gap configuration.

The reference signals included in the N reference signal groups are reference signals that need to be measured by a terminal device, and the reference signals that need to be measured by the terminal device may be at least one of the following: SSBs, PRSs, CSI-RSs, DMRSs, SRSs, and CRSs. The correspondence may be carried in any one of the following messages: an RRC message, DCI, a MAC CE message, an LPP message, and an LPPa message.

In the solution provided in this application, the terminal device receives the correspondence between the N measurement gap configurations and the N reference signal groups from the network device, and reference signals included in each group of reference signals occupy a same time domain resource. In this way, the terminal device can obtain, based on a measurement gap configuration corresponding to a reference signal that occupies a specific time domain resource, a measurement gap for measuring the reference signal that occupies the time domain resource, so that the reference signals that need to be measured by the terminal device can be measured. This avoids a technical problem in the conventional technology that a part of reference signals cannot be measured because the terminal device can measure a reference signal only in one measurement gap in frequency domain.

With reference to the first aspect, in an implementation of the first aspect, the one or more reference signals included in the reference signal group are used for a same measurement purpose and/or the one or more reference signals included in the reference signal group are of a same type.

In the solution provided in this application, when the one or more reference signals included in the reference signal group occupy a same time domain resource and are used for a same measurement purpose, not only all the reference signals that need to be measured by the terminal device can be measured, but also the terminal device can simultaneously perform measurement for all preset measurement purposes. This avoids a case in which measurement for another measurement purpose is interrupted or cannot be performed when measurement for a specific measurement purpose is performed.

When the one or more reference signals included in the reference signal group occupy a same time domain resource, are used for a same measurement purpose, and are of a same type, not only all the reference signals that need to be measured by the terminal device can be measured, but also the terminal device can simultaneously perform measurement for all preset measurement purposes. In addition, a reporting time of a measurement result obtained after a specific type of reference signal is measured can well comply with a property of the type of reference signal.

When the one or more reference signals included in the reference signal group occupy a same time domain resource and are used for a same measurement purpose, not only all the reference signals that need to be measured by the terminal device can be measured, but also the terminal device can simultaneously perform measurement for all preset measurement purposes. This avoids a case in which measurement for another measurement purpose is interrupted or cannot be performed when measurement for a specific measurement purpose is performed.

When the one or more reference signals included in the reference signal group occupy a same time domain resource and are of a same type, not only all the reference signals that need to be measured by the terminal device can be measured, but also a reporting time of a measurement result obtained after a specific type of measurement signal is measured can well comply with a property of the type of reference signal.

When the one or more reference signals included in the reference signal group are used for a same measurement purpose and are of a same type, not only the terminal device can simultaneously perform measurement for all preset measurement purposes, but also a reporting time of a measurement result obtained after a specific type of reference signal is measured can well comply with a property of the type of reference signal.

With reference to the first aspect, in an implementation of the first aspect, the one or more reference signals included in the reference signal group correspond to a same frequency; or the one or more reference signals included in the reference signal group correspond to a same cell; or the one or more reference signals included in the reference signal group correspond to a plurality of cells; or the one or more reference signals included in the reference signal group correspond to a plurality of frequencies.

In the solution provided in this application, when the one or more reference signals included in the reference signal group correspond to the same cell, the network device can precisely control a time at which the terminal device measures each cell. When the one or more reference signals included in the reference signal group correspond to the same frequency, the network device can precisely control a time at which the terminal device measures each frequency. When the one or more reference signals included in the reference signal group correspond to the plurality of cells or the one or more reference signals included in the reference signal group correspond to the plurality of frequencies, signaling overheads can be reduced, and energy consumption of the terminal can be reduced.

With reference to the first aspect, in an implementation of the first aspect, before the receiving a correspondence from a network device, the communication method further includes:

sending a configuration request to the network device, where the configuration request is used to indicate to configure different measurement gap configurations for reference signals that occupy different time domain resources.

Optionally, when the one or more reference signals included in the reference signal group are used for the same measurement purpose, the configuration request is further used to indicate to configure different measurement gap configurations for reference signals that are used for different measurement purposes.

When the one or more reference signals included in the reference signal group are of the same type, the configuration request is further used to indicate to configure different measurement gap configurations for reference signals of different types.

In the solution provided in this application, the configuration request is sent to the network device, so that the measurement gap configuration configured by the network device can better meet a requirement of the terminal.

With reference to the first aspect, in an implementation of the first aspect, the communication method further includes: obtaining, based on the first measurement gap configuration and configuration information of the one or more reference signals included in the first reference signal group, a reporting time corresponding to the first measurement gap configuration; and sending a measurement result to the network device at the reporting time, where the measurement result is a measurement result obtained after the one or more reference signals included in the first reference signal group are measured.

In the solution provided in this application, in a measurement gap corresponding to each measurement gap configuration, measurement results obtained through measurement may correspond to different reporting time.

According to a second aspect, a communication method is provided. The communication method includes: obtaining a correspondence, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1; and sending the correspondence to a terminal device, where one first measurement gap configuration in the N measurement gap configurations is used by the terminal device to measure one or more reference signals included in a first reference signal group corresponding to the first measurement gap configuration.

The reference signals included in the N reference signal groups are reference signals that need to be measured by the terminal device, and the reference signals that need to be measured by the terminal device may be at least one of the following: SSBs, PRSs, CSI-RSs, DMRSs, SRSs, and CRSs. The correspondence may be carried in any one of the following messages: an RRC message, DCI, a MAC CE message, an LPP message, and an LPPa message.

In the solution provided in this application, a network device sends the correspondence between the N measurement gap configurations and the N reference signal groups to the terminal device, and reference signals included in each group of reference signals occupy a same time domain resource. In this way, the terminal device can obtain, based on a measurement gap configuration corresponding to a reference signal that occupies a specific time domain resource, a measurement gap for measuring the reference signal that occupies the time domain resource, so that the reference signals that need to be measured by the terminal device can be measured. This avoids a technical problem in the conventional technology that a part of reference signals cannot be measured because the terminal device can measure a reference signal only in one measurement gap in frequency domain.

With reference to the second aspect, in an implementation of the second aspect, the one or more reference signals included in the reference signal group are used for a same measurement purpose and/or the one or more reference signals included in the reference signal group are of a same type.

Beneficial effects of the solution provided in this application are the same as beneficial effects of the corresponding implementations of the first aspect.

With reference to the second aspect, in an implementation of the second aspect, the obtaining a correspondence includes: receiving a configuration request from the terminal device, where the configuration request is used to indicate to configure different measurement gap configurations for reference signals that occupy different time domain resources; and obtaining the correspondence based on the configuration request.

Optionally, when the one or more reference signals included in the reference signal group are used for the same measurement purpose, the configuration request is further used to indicate to configure different measurement gap configurations for reference signals that are used for different measurement purposes.

Optionally, when the one or more reference signals included in the reference signal group are of the same type, the configuration request is further used to indicate to configure different measurement gap configurations for reference signals of different types.

Beneficial effects of the solution provided in this application are the same as beneficial effects of the corresponding implementations of the first aspect.

With reference to the second aspect, in an implementation of the second aspect, the obtaining a correspondence includes:
   obtaining the N reference signal groups;
   for one first reference signal group in the N reference signal groups, obtaining a measurement gap configuration of the first reference signal group based on the first reference signal group; and
   generating the correspondence based on each reference signal group and the measurement gap configuration corresponding to each reference signal group.

In an embodiment, when the reference signals included in the N reference signal groups occupy a same time domain resource, the obtaining the N reference signal groups may be implemented in the following three manners:
   Manner 1: It is determined that reference signals that occupy a same time domain resource and that are in the reference signals that need to be measured by the terminal device are a group of reference signals in the N reference signal groups.
   Manner 2: For one first frequency in frequencies corresponding to the reference signals that need to be measured by the terminal device, it is determined that reference signals that correspond to the first frequency and that occupy a same time domain resource are one of the N reference signal groups.
   Manner 3: For one first cell in cells corresponding to the reference signals that need to be measured by the terminal device, it is determined that reference signals that correspond to the first cell and that occupy a same time domain resource are one of the N reference signal groups.

When the reference signals included in the N reference signal groups occupy a same time domain resource and are used for a same measurement purpose, the obtaining the N reference signal groups may be implemented in the following three manners:
   Manner 1: It is determined that reference signals that occupy a same time domain resource and are used for a same measurement purpose and that are in the reference signals that need to be measured by the terminal device are a group of reference signals in the N reference signal groups.
   Manner 2: For one first frequency in frequencies corresponding to the reference signals that need to be measured by the terminal device, it is determined that reference signals that correspond to the first frequency and that occupy a same time domain resource and are used for a same measurement purpose are one of the N reference signal groups.
   Manner 3: For one first cell in cells corresponding to the reference signals that need to be measured by the terminal device, it is determined that reference signals that correspond to the first cell and that occupy a same time domain resource and are used for a same measurement purpose are one of the N reference signal groups.

When the reference signals included in the N reference signal groups occupy a same time domain resource, are used for a same measurement purpose, and are of a same type, the obtaining the N reference signal groups may be implemented in the following three manners:
   Manner 1: It is determined that reference signals that are of a same type, occupy a same time domain resource, and are used for a same measurement purpose and that are in the reference signals that need to be measured by the terminal device are a group of reference signals in the N reference signal groups.
   Manner 2: For one first frequency in frequencies corresponding to the reference signals that need to be measured by the terminal device, it is determined that reference signals that correspond to the first frequency and that are of a same type, occupy a same time domain resource, and are used for a same measurement purpose are one of the N reference signal groups.
   Manner 3: For one first cell in cells corresponding to the reference signals that need to be measured by the terminal device, it is determined that reference signals that correspond to the first cell and that are of a same type, occupy a same time domain resource, and are used for a same measurement purpose are one of the N reference signal groups.

In an embodiment, the obtaining the N reference signal groups includes:
   receiving grouping information from a core network device, where the grouping information indicates the N reference signal groups.

In the solution provided in this application, two specific implementations in which the network device obtains the N reference signal groups are provided.

With reference to the second aspect, in an implementation of the second aspect, a receiving time corresponding to the first measurement gap configuration is obtained based on the first measurement gap configuration and configuration information of the one or more reference signals included in the first reference signal group; and a measurement result is received at the receiving time, where the measurement result is a measurement result obtained after the one or more reference signals included in the first reference signal group are measured.

In the solution provided in this application, the network device may receive, at different corresponding receiving time, measurement results obtained by measuring measurement gaps corresponding to measurement gap configurations.

According to a third aspect, a communication method is provided. The communication method includes: receiving a correspondence from a network device, where the correspondence is a correspondence between N measurement gap configurations and N reference signal groups, one or more reference signals included in the reference signal group are used for a same measurement purpose, the N reference signal groups are in a one-to-one correspondence with the N measurement gap configurations, and N is an integer greater than 1; and for one first measurement gap configuration in the N measurement gap configurations, measuring, based on the first measurement gap configuration, one or more reference signals included in a first reference signal group corresponding to the first measurement gap configuration.

The reference signals included in the N reference signal groups are reference signals that need to be measured by a terminal device, and the reference signals that need to be measured by the terminal device may be at least one of the following: SSBs, PRSs, CSI-RSs, DMRSs, SRSs, and CRSs. The correspondence may be carried in any one of the following messages: an RRC message, DCI, a MAC CE message, an LPP message, and an LPPa message.

In the solution provided in this application, the terminal device receives, from the network device, the correspondence between the N measurement gap configurations and the N reference signal groups, and reference signals included in each group of reference signals are used for a same measurement purpose. In this way, the terminal device can obtain, based on a measurement gap configuration corresponding to a reference signal that is used for a specific measurement purpose, a measurement gap for measuring the reference signal that is used for the measurement purpose, so that all preset measurement purposes can be implemented.

This avoids a case in which measurement for another measurement purpose is interrupted or cannot be performed because measurement for a specific measurement purpose needs to be performed.

With reference to the third aspect, in an implementation of the third aspect, the one or more reference signals included in the reference signal group occupy a same time domain resource and/or the one or more reference signals included in the reference signal group are of a same type.

Beneficial effects of the solution provided in this application are the same as beneficial effects of the corresponding implementations of the first aspect.

With reference to the third aspect, in an implementation of the third aspect, the one or more reference signals included in the reference signal group correspond to a same frequency; or the one or more reference signals included in the reference signal group correspond to a same cell; or the one or more reference signals included in the reference signal group correspond to a plurality of cells; or the one or more reference signals included in the reference signal group correspond to a plurality of frequencies.

Beneficial effects of the solution provided in this application are the same as beneficial effects of the corresponding implementations of the first aspect.

With reference to the third aspect, in an implementation of the third aspect, before the receiving a correspondence from a network device, the communication method further includes:

sending a configuration request to the network device, where the configuration request is used to indicate to configure different measurement gap configurations for reference signals that are used for different measurement purposes.

Optionally, when the one or more reference signals included in the reference signal group occupy the same time domain resource, the configuration request is further used to indicate to configure different measurement gap configurations for reference signals that occupy different time domain resources.

When the one or more reference signals included in the reference signal group are of the same type, the configuration request is further used to indicate to configure different measurement gap configurations for reference signals of different types.

Beneficial effects of the solution provided in this application are the same as beneficial effects of the corresponding implementations of the first aspect.

With reference to the third aspect, in an implementation of the third aspect, the communication method further includes: obtaining, based on the first measurement gap configuration and configuration information of the one or more reference signals included in the first reference signal group, a reporting time corresponding to the first measurement gap configuration; and sending a measurement result to the network device at the reporting time, where the measurement result is a measurement result obtained after the one or more reference signals included in the first reference signal group are measured.

Beneficial effects of the solution provided in this application are the same as beneficial effects of the corresponding implementations of the first aspect.

According to a fourth aspect, a communication method is provided. The communication method includes: obtaining a correspondence, where the correspondence is a correspondence between N measurement gap configurations and N reference signal groups, one or more reference signals included in the reference signal group are used for a same measurement purpose, the N reference signal groups are in a one-to-one correspondence with the N measurement gap configurations, and N is an integer greater than 1; and sending the correspondence to a terminal device, where one first measurement gap configuration in the N measurement gap configurations is used by the terminal device to measure one or more reference signals included in a first reference signal group corresponding to the first measurement gap configuration.

The reference signals included in the N reference signal groups are reference signals that need to be measured by the terminal device, and the reference signals that need to be measured by the terminal device may be at least one of the following: SSBs, PRSs, CSI-RSs, DMRSs, SRSs, and CRSs. The correspondence may be carried in any one of the following messages: an RRC message, DCI, a MAC CE message, an LPP message, and an LPPa message.

In the solution provided in this application, the network device sends the correspondence between the N measurement gap configurations and the N reference signal groups to the terminal device, and reference signals included in each group of reference signals are used for a same measurement purpose. In this way, the terminal device can obtain, based on a measurement gap configuration corresponding to a reference signal that is used for a specific measurement purpose, a measurement gap for measuring the reference signal that is used for the measurement purpose, so that all preset measurement purposes can be implemented. This avoids a case in which measurement for another measurement purpose is interrupted or cannot be performed because measurement for a specific measurement purpose needs to be performed.

With reference to the fourth aspect, in an implementation of the fourth aspect, the one or more reference signals included in the reference signal group occupy a same time domain resource and/or the one or more reference signals included in the reference signal group are of a same type.

Beneficial effects of the solution provided in this application are the same as beneficial effects of the corresponding implementations of the first aspect.

With reference to the fourth aspect, in an implementation of the fourth aspect, the obtaining a correspondence includes: receiving a configuration request from the terminal device, where the configuration request is used to indicate to configure different measurement gap configurations for reference signals that are used for different measurement purposes; and obtaining the correspondence based on the configuration request.

Optionally, when the one or more reference signals included in the reference signal group occupy the same time domain resource, the configuration request is further used to indicate to configure different measurement gap configurations for reference signals that occupy different time domain resources.

Optionally, when the one or more reference signals included in the reference signal group are of the same type, the configuration request is further used to indicate to configure different measurement gap configurations for reference signals of different types.

Beneficial effects of the solution provided in this application are the same as beneficial effects of the corresponding implementations of the first aspect.

With reference to the fourth aspect, in an implementation of the fourth aspect, the obtaining a correspondence includes:

obtaining the N reference signal groups;
for one first reference signal group in the N reference signal groups, obtaining a measurement gap configuration of the first reference signal group based on the first reference signal group; and
generating the correspondence based on each reference signal group and the measurement gap configuration corresponding to each reference signal group.

In an embodiment, when the reference signals included in the N reference signal groups are used for a same measurement purpose, the obtaining the N reference signal groups may be implemented in the following three manners:

Manner 1: It is determined that reference signals that are used for a same measurement purpose and that are in the reference signals that need to be measured by the terminal device are a group of reference signals in the N reference signal groups.

Manner 2: For one first frequency in frequencies corresponding to the reference signals that need to be measured by the terminal device, it is determined that reference signals that correspond to the first frequency and that are used for a same measurement purpose are one of the N reference signal groups.

Manner 3: For one first cell in cells corresponding to the reference signals that need to be measured by the terminal device, it is determined that reference signals that correspond to the first cell and that are used for a same measurement purpose are one of the N reference signal groups.

When the reference signals included in the N reference signal groups occupy a same time domain resource and are used for a same measurement purpose, the obtaining the N reference signal groups may be implemented in the following three manners:

Manner 1: It is determined that reference signals that occupy a same time domain resource and are used for a same measurement purpose and that are in the reference signals that need to be measured by the terminal device are a group of reference signals in the N reference signal groups.

Manner 2: For one first frequency in frequencies corresponding to the reference signals that need to be measured by the terminal device, it is determined that reference signals that correspond to the first frequency and that occupy a same time domain resource and are used for a same measurement purpose are one of the N reference signal groups.

Manner 3: For one first cell in cells corresponding to the reference signals that need to be measured by the terminal device, it is determined that reference signals that correspond to the first cell and that occupy a same time domain resource and are used for a same measurement purpose are one of the N reference signal groups.

When the reference signals included in the N reference signal groups occupy a same time domain resource, are used for a same measurement purpose, and are of a same type, the obtaining the N reference signal groups may be implemented in the following three manners:

Manner 1: It is determined that reference signals that are of a same type, occupy a same time domain resource, and are used for a same measurement purpose and that are in the reference signals that need to be measured by the terminal device are a group of reference signals in the N reference signal groups.

Manner 2: For one first frequency in frequencies corresponding to the reference signals that need to be measured by the terminal device, it is determined that reference signals that correspond to the first frequency and that are of a same type, occupy a same time domain resource, and are used for a same measurement purpose are one of the N reference signal groups.

Manner 3: For one first cell in cells corresponding to the reference signals that need to be measured by the terminal device, it is determined that reference signals that correspond to the first cell and that are of a same type, occupy a same time domain resource, and are used for a same measurement purpose are one of the N reference signal groups.

In an embodiment, the obtaining the N reference signal groups includes:
receiving grouping information from a core network device, where the grouping information indicates the N reference signal groups.

Beneficial effects of the solution provided in this application are the same as beneficial effects of the corresponding implementations of the second aspect.

With reference to the fourth aspect, in an implementation of the fourth aspect, a receiving time corresponding to the first measurement gap configuration is obtained based on the first measurement gap configuration and configuration information of the one or more reference signals included in the first reference signal group; and a measurement result is received at the receiving time, where the measurement result is a measurement result obtained after the one or more reference signals included in the first reference signal group are measured.

Beneficial effects of the solution provided in this application are the same as beneficial effects of the corresponding implementations of the second aspect.

According to a fifth aspect, a computer-readable storage medium is provided. The computer-readable storage medium stores a computer program. When the program is executed by a processor, the method according to any one of the first aspect or the possible implementations of the first aspect is implemented.

According to a sixth aspect, a communication apparatus is provided. The communication apparatus is configured to perform the communication method according to any one of the first aspect or the implementations of the first aspect. The communication apparatus may include a module configured to perform the communication method according to any one of the first aspect or the implementations of the first aspect.

According to a seventh aspect, a communication apparatus is provided. The communication apparatus includes a memory, a processor, and a program that is stored in the memory and that can be run on the processor. When the processor executes the program, the method according to any one of the first aspect or the implementations of the first aspect is implemented.

According to an eighth aspect, a computer-readable storage medium is provided. The computer-readable storage medium stores a computer program. When the program is executed by a processor, the method according to any one of the second aspect or the implementations of the second aspect is implemented.

According to a ninth aspect, a communication apparatus is provided. The communication apparatus is configured to perform the communication method according to any one of the second aspect or the implementations of the second aspect. The communication apparatus may include a module configured to perform the communication method according to any one of the second aspect or the implementations of the second aspect.

According to a tenth aspect, a communication apparatus is provided. The communication apparatus includes a memory, a processor, and a program that is stored in the memory and that can be run on the processor. When the processor executes the program, the method according to any one of the second aspect or the implementations of the second aspect is implemented.

According to an eleventh aspect, a computer-readable storage medium is provided. The computer-readable storage medium stores a computer program. When the program is executed by a processor, the method according to any one of the third aspect or the implementations of the third aspect is implemented.

According to a twelfth aspect, a communication apparatus is provided. The communication apparatus is configured to perform the communication method according to any one of the third aspect or the implementations of the third aspect. The communication apparatus may include a module configured to perform the communication method according to any one of the third aspect or the implementations of the third aspect.

According to a thirteenth aspect, a communication apparatus is provided. The communication apparatus includes a memory, a processor, and a program that is stored in the memory and that can be run on the processor. When the processor executes the program, the method according to any one of the third aspect or the implementations of the third aspect is implemented.

According to a fourteenth aspect, a computer-readable storage medium is provided. The computer-readable storage medium stores a computer program. When the program is executed by a processor, the method according to any one of the fourth aspect or the implementations of the fourth aspect is implemented.

According to a fifteenth aspect, a communication apparatus is provided. The communication apparatus is configured to perform the communication method according to any one of the fourth aspect or the implementations of the fourth aspect. The communication apparatus may include a module configured to perform the communication method according to any one of the fourth aspect or the implementations of the fourth aspect.

According to a sixteenth aspect, a communication apparatus is provided. The communication apparatus includes a memory, a processor, and a program that is stored in the memory and that can be run on the processor. When the processor executes the program, the method according to any one of the fourth aspect or the implementations of the fourth aspect is implemented.

DESCRIPTION OF EMBODIMENTS

Figure 1:
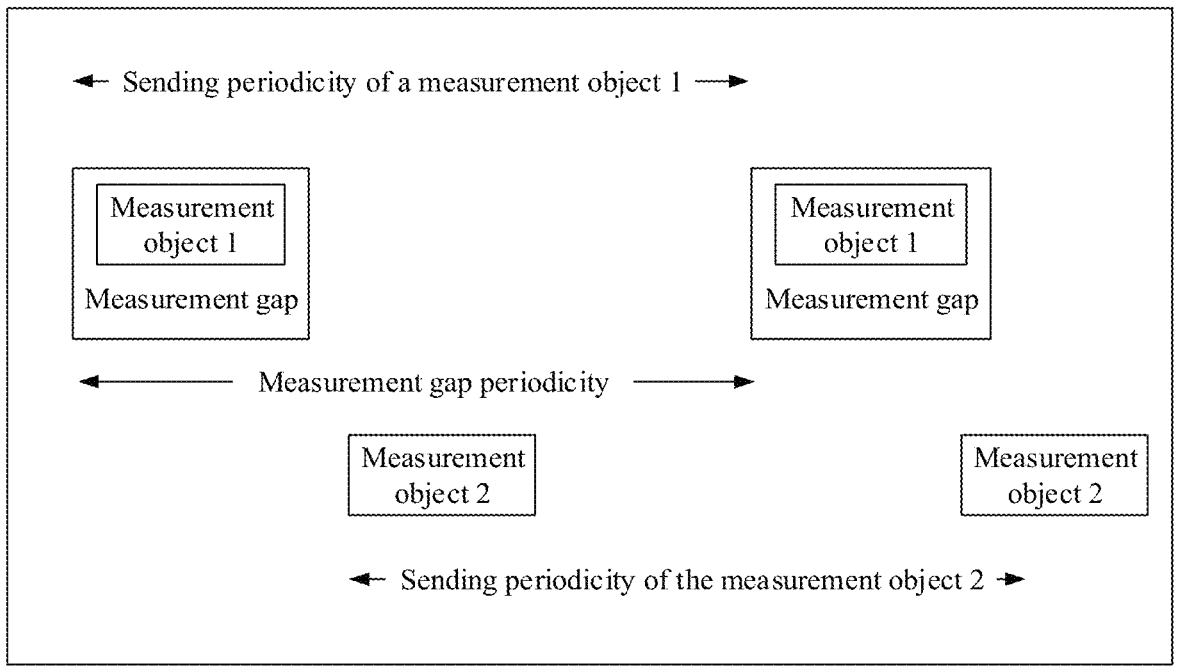
FIG. 1 is a schematic diagram of a measurement gap in the conventional technology.

The following describes technical solutions of this application with reference to the accompanying drawings.

It should be understood that the technical solutions in embodiments of this application may be used for a long term evolution (LTE) architecture, or may be used for a universal mobile telecommunications system (UMTS) terrestrial radio access network (UTRAN) architecture, or a system for mobile communications (GSM)/enhanced data rates for GSM evolution (EDGE) system radio access network (GERAN) architecture. In the UTRAN architecture or the GERAN architecture, a function of an MME is completed by a serving general packet radio service (GPRS) support node (SGSN), and a function of an SGW/a PGW is completed by a gateway GPRS support node (GGSN). The technical solutions in the embodiments of this application may be further applied to another communication system, such as a public land mobile network (PLMN) system, or even a future 5G communication system or a communication system after 5G. This is not limited in the embodiments of this application.

A terminal device is provided in the embodiments of this application. The terminal device may include a wireless transceiver function and can cooperate with a network device to provide a communication service for a user. The terminal device may be user equipment (UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network or a network after 5G. This is not limited in the embodiments of this application.

A network device is further provided in the embodiments of this application. The network device may be a device configured to communicate with a terminal device. For example, the network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, a vehicle-mounted device, a wearable device, a network-side device in a future 5G network or a network after 5G, a network device in a future evolved PLMN network, or the like.

The network device in the embodiments of this application may also be referred to as a radio access network (RAN) device. The RAN device is connected to the terminal device, to receive data from the terminal device and send the data to a core network device. The RAN device corresponds to different devices in different communication systems, for example, corresponds to a base station and a base station controller in a 2G system, corresponds to a base station and a radio network controller (RNC) in a 3G system, corresponds to an evolved NodeB (eNB) in a 4G system, and corresponds to an access network device (for example, a gNB, a CU, or a DU) in a 5G system such as a new radio access system (NR).

A core network (CN) device is further provided in the embodiments of this application. The CN device corresponds to different devices in different communication systems, for example, corresponds to a serving GPRS support node (SGSN) or a gateway GPRS support node (GGSN) in the 3G system, corresponds to a mobility management entity (MME) or a serving gateway (S-GW) in the 4G system, and in the 5G system, corresponds to a core network-related device (for example, an NG-Core) in the 5G system.

For ease of understanding this application, some elements introduced into descriptions of this application are first described herein.

A measurement gap configuration includes a measurement gap periodicity and a measurement gap duration (gapoffset), and a start time (namely, a time at which measurement starts, for example, a specific subframe of a specific system frame in which measurement starts) of a measurement gap may be obtained through calculation based on the measurement gap periodicity and the measurement gap duration (gapoffset).

A measurement gap is a part of time (gapoffset) that is reserved. In this period of time, a terminal device does not send or receive any data, but adjusts a receiver to a frequency of a target cell to perform inter-frequency measurement, and after the measurement ends, adjusts the receiver to a frequency of a serving cell. That the terminal device does not send or receive any data means that the terminal device does not send physical uplink shared channel (PUSCH) data to a base station, and does not send information such as a hybrid automatic repeat request (HARQ)-acknowledgement or Acknowledgement), a channel quality indicator (CQI), a precoding matrix indicator (PMI), a rank indicator (RI), and a sounding reference signal (SRS). In addition, the base station does not schedule any downlink or uplink resource for the terminal device.

To better describe this application, the conventional technology is first described with reference to FIG. 1. FIG. 1 is a schematic diagram of a measurement gap in the conventional technology.

A terminal device can measure a reference signal in each frequency domain only by using a single measurement gap. Therefore, to measure measurement objects (reference signal that need to be measured by the terminal device) in each frequency domain, time domain resources occupied by all the measurement objects need to be the same. If measurement objects occupy different time domain resources, measurement objects with occupied time domain resources being located outside the measurement gap cannot be detected by the terminal device. As shown in FIG. 1, a measurement object 1 and a measurement object 2 in FIG. 1 occupy different time domain resources. A measurement gap used by the terminal device in corresponding frequency domain may be used to measure the measurement object 1, but cannot be used to measure the measurement object 2. When a frequency corresponding to the measurement object 1 is different from that corresponding to the measurement object 2, the terminal device cannot measure the measurement object 2, and consequently cannot obtain signal information of the frequency corresponding to the measurement object 2.

Based on the foregoing problem, a communication method in the embodiments of this application is provided.

Figure 2:
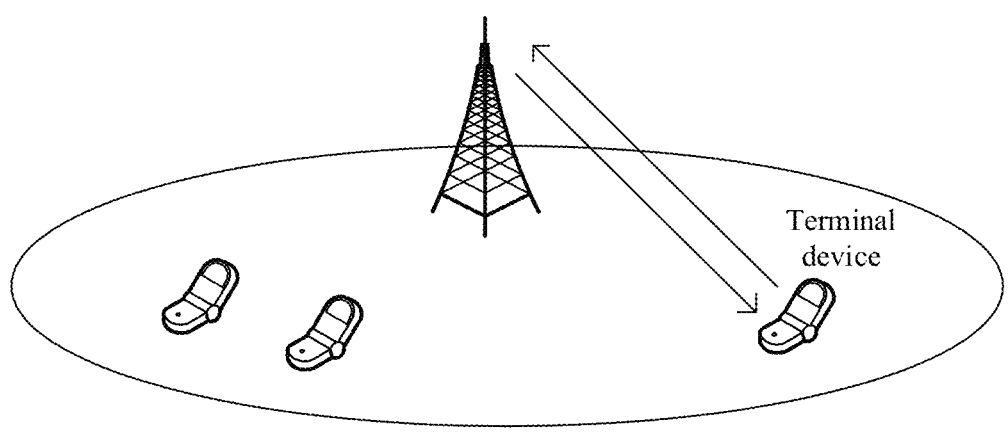
FIG. 2 is a schematic diagram of a system architecture according to an embodiment of this application.

FIG. 2 is a schematic diagram of a system architecture according to an embodiment of this application. As shown in FIG. 2, the system architecture includes a network device and a terminal device.

The network device obtains a correspondence between N measurement gap configurations and N reference signal groups, and sends the correspondence to the terminal device. According to an indication of the correspondence, for one first measurement gap configuration in the N measurement gap configurations, the terminal device measures, based on the first measurement gap configuration, one or more reference signals in a first reference signal group corresponding to the first measurement gap configuration.

The following describes the communication method in this application by using specific embodiments.

Figure 3:
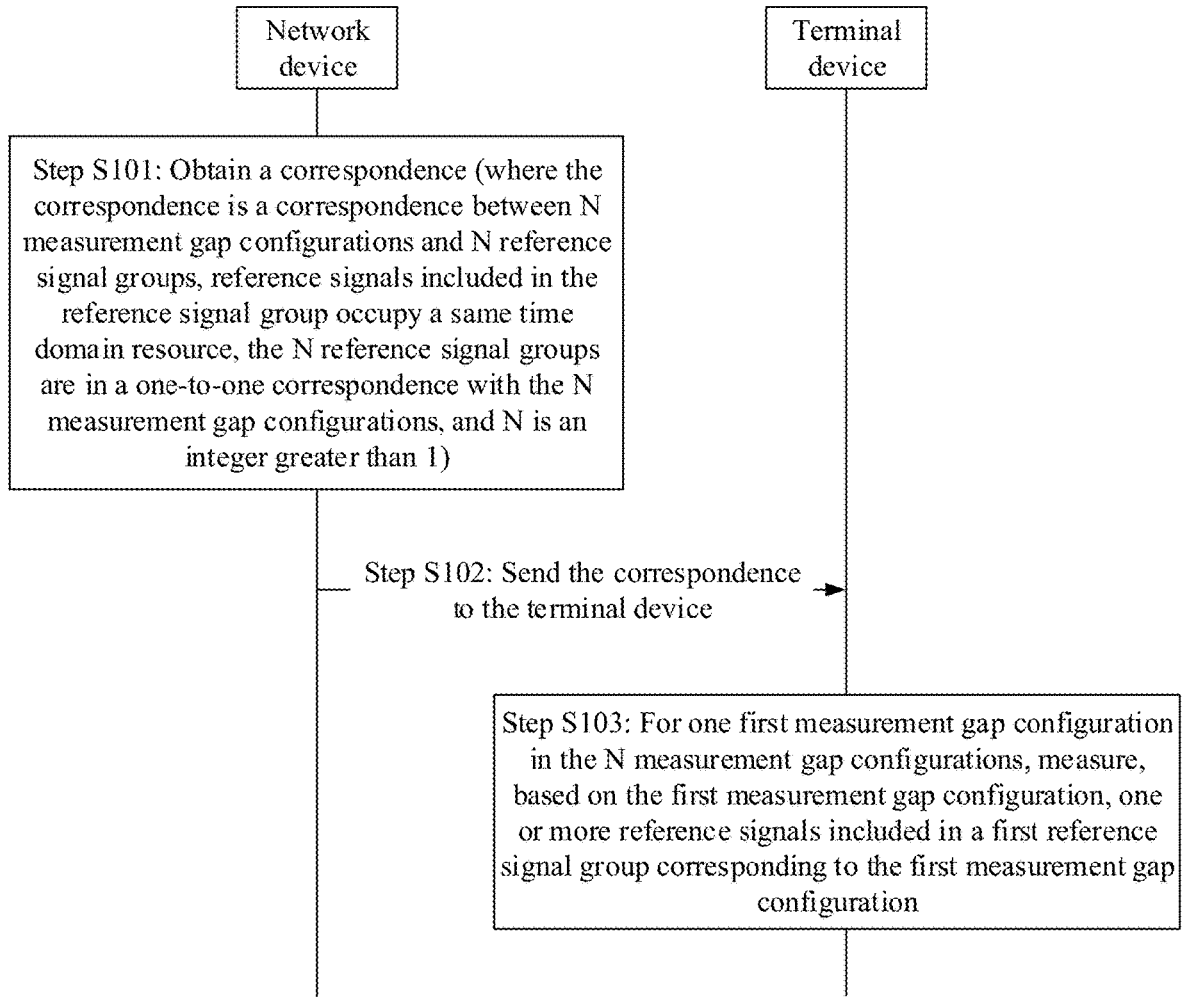
FIG. 3 is an interaction diagram 1 of a communication method according to an embodiment of this application.

FIG. 3 is an interaction diagram 1 of a communication method according to an embodiment of this application. Referring to FIG. 3, the method in this embodiment includes the following operations.

Operation S101: A network device obtains a correspondence, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1.

When a terminal device needs to measure an inter-frequency cell or an inter-frequency frequency, the network device needs to configure a measurement gap configuration for the terminal device. The terminal device measures the inter-frequency cell or the inter-frequency frequency by measuring a reference signal. In this embodiment, all reference signals that need to be measured may be referred to as reference signals that need to be measured by the terminal device.

The reference signals that need to be measured by the terminal device may be at least one of the following: synchronization signal blocks (SS/PBCH block or SSB), positioning reference signals (PRS), channel state information-reference signals (CSI-RS), demodulation reference signals (DMRS), SRSs, and cell-specific reference signals (CRS). A measurement quantity of the reference signals by the terminal device may be at least one of the following: a reference signal received power (RSRP), a reference signal received quality (RSRQ), a signal to interference plus noise ratio (SINR), and a reference signal time difference of arrival (RSTD).

That the network device obtains the correspondence includes the following operations.

a1: Obtain the N reference signal groups.

In a manner, the network device may group, based on time domain resources occupied by the reference signals, the reference signals that need to be measured by the terminal device into N groups, to obtain the N reference signal groups. Implementations include but are not limited to the following:

Implementation 1: It is determined that reference signals that occupy a same time domain resource and that are in the reference signals that need to be measured by the terminal device are a group of reference signals in the N reference signal groups. In other words, the reference signals that occupy the same time domain resource and that are in the reference signals that need to be measured by the terminal device are grouped into one group, so that the N reference signal groups are obtained. The one or more reference signals included in the reference signal group obtained in this implementation correspond to one or more cells and one or more frequencies.

For example, the terminal device needs to measure reference signals SSB 1, SSB 2, SSB 3, SSB 4, and SSB 5, and frequencies respectively corresponding to the SSB 1, the SSB 2, the SSB 3, the SSB 4, and the SSB 5 are $X_1, X_2, X_3, X_4$, and $X_5$. That is, the SSB 1 needs to be measured to implement radio resource management (RRM) measurement on the frequency $X_1$, the SSB 2 needs to be measured to implement RRM measurement on the frequency $X_2$, the SSB 3 needs to be measured to implement RRM measurement on the frequency $X_3$, the SSB 4 needs to be measured to implement RRM measurement on the frequency $X_4$, and the SSB 5 needs to be measured to implement RRM measurement on the frequency $X_5$. Time domain resources occupied by the SSB 1 and the SSB 2 are the same, time domain resources occupied by the SSB 4 and the SSB 5 are the same, and a time domain resource occupied by the SSB 3 is different from those occupied by the SSB 1, SSB 2, SSB 4, and SSB 5. In this case, the SSB 1 and the SSB 2 are grouped into one reference signal group, the SSB 4 and the SSB 5 are grouped into one reference signal group, and the SSB 3 is grouped into one reference signal group, so that three reference signal groups are obtained.

For example, the terminal device needs to measure reference signals SSB 1, SSB 2, SSB 3, SSB 4, SSB 5, and SSB 6. The SSB 1 and the SSB 2 correspond to a frequency $X_1$, the SSB 3 corresponds to a frequency $X_2$, the SSB 4 corresponds to a frequency $X_3$, and the SSB 5 and SSB 6 correspond to a frequency $X_4$. That is, the SSB 1 and the SSB 2 need to be measured to implement RRM measurement on the frequency $X_1$, the SSB 3 needs to be measured to implement RRM measurement on the frequency $X_2$, the SSB 4 needs to be measured to implement RRM measurement on the frequency $X_3$, and the SSB 5 and the SSB 6 need to be measured to implement RRM measurement on the frequency $X_4$. Time domain resources occupied by the SSB 1 and the SSB 3 are the same, time domain resources occupied by the SSB 2 and the SSB 5 are the same, and time domain resources occupied by the SSB 4 and the SSB 6 are the same. In this case, the SSB 1 and the SSB 3 are grouped into one reference signal group, the SSB 2 and the SSB 5 are grouped into one reference signal group, and the SSB 4 and the SSB 6 are grouped into one reference signal group, so that three reference signal groups are obtained.

For example, the terminal device needs to measure reference signals SSB 1, SSB 2, SSB 3, SSB 4, SSB 5, and SSB 6. The SSB 1 corresponds to a cell $Y_1$, the SSB 2 corresponds to a cell $Y_2$, the SSB 3 corresponds to a cell $Y_3$, the SSB 4 corresponds to a cell $Y_4$, the SSB 5 corresponds to a cell $Y_5$, and the SSB 6 corresponds to a cell $Y_6$. That is, the SSB 1 needs to be measured to implement RRM measurement on the cell $Y_1$, the SSB 2 needs to be measured to implement RRM measurement on the cell $Y_2$, the SSB 3 needs to be measured to implement RRM measurement on the cell $Y_3$, the SSB 4 needs to be measured to implement RRM measurement on the cell $Y_4$, the SSB 5 needs to be measured to implement RRM measurement on the cell $Y_5$, and the SSB 6 needs to be measured to implement RRM measurement on the cell $Y_6$. Time domain resources occupied by the SSB 1 and the SSB 3 are the same, time domain resources occupied by the SSB 2 and the SSB 5 are the same, and time domain resources occupied by the SSB 4 and the SSB 6 are the same. In this case, the SSB 1 and the SSB 3 are grouped into one reference signal group, the SSB 2 and the SSB 5 are grouped into one reference signal group, and the SSB 4 and the SSB 6 are grouped into one reference signal group, so that three reference signal groups are obtained.

Implementation 2: For one first frequency in frequencies corresponding to the reference signals that need to be measured by the terminal device, it is determined that reference signals that correspond to the first frequency and that occupy a same time domain resource are one of the N reference signal groups. In other words, reference signals that correspond to each frequency and occupy a same time domain resource and that need to be measured by the terminal device are grouped into one reference signal group. The one or more reference signals included in the reference signal group obtained in this implementation correspond to a same frequency. The frequency corresponding to the reference signals is a frequency corresponding to a frequency domain resource occupied by the reference signals.

For example, the terminal device needs to measure reference signals SSB 1, SSB 2, SSB 3, SSB 4, and SSB 5, and frequencies respectively corresponding to the SSB 1, the SSB 2, the SSB 3, the SSB 4, and the SSB 5 are $X_1, X_2, X_3, X_4$, and $X_5$. That is, the SSB 1 needs to be measured to implement RRM measurement on the frequency $X_1$, the SSB 2 needs to be measured to implement RRM measurement on the frequency $X_2$, the SSB 3 needs to be measured to implement RRM measurement on the frequency $X_3$, the SSB 4 needs to be measured to implement RRM measurement on the frequency $X_4$, and the SSB 5 needs to be measured to implement RRM measurement on the frequency $X_5$. Time domain resources occupied by the SSB 1 and the SSB 2 are the same, time domain resources occupied by the SSB 4 and the SSB 5 are the same, and a time domain resource occupied by the SSB 3 is different from those occupied by the SSB 1, SSB 2, SSB 4, and SSB 5. In this case, the SSB 1 is grouped into one reference signal group, the SSB 2 is grouped into one reference signal group, the SSB 3 is grouped into one reference signal group, the SSB 4 is grouped into one reference signal group, and the SSB 5 is grouped into one reference signal group, so that five reference signal groups are obtained.

For example, the terminal device needs to measure reference signals SSB 1, SSB 2, SSB 3, SSB 4, SSB 5, and SSB 6. The SSB 1 and the SSB 2 correspond to a frequency $X_1$, the SSB 3 corresponds to a frequency $X_2$, the SSB 4 corresponds to a frequency $X_3$, and the SSB 5 and SSB 6 correspond to a frequency $X_4$. That is, the SSB 1 and the SSB 2 need to be measured to implement RRM measurement on the frequency $X_1$, the SSB 3 needs to be measured to implement RRM measurement on the frequency $X_2$, the SSB 4 needs to be measured to implement RRM measurement on the frequency $X_3$, and the SSB 5 and the SSB 6 need to be measured to implement RRM measurement on the frequency $X_4$. Time domain resources occupied by the SSB 1 and the SSB 2 are different, time domain resources occupied by the SSB 5 and the SSB 6 are different, time domain resources occupied by the SSB 1 and the SSB 3 are the same, time domain resources occupied by the SSB 2 and the SSB 5 are the same, and time domain resources occupied by the SSB 4 and the SSB 6 are the same. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, and the SSB 6 is grouped into one reference signal group, so that six reference signal groups are obtained.

Implementation 3: For one first cell in cells corresponding to the reference signals that need to be measured by the terminal device, it is determined that reference signals that correspond to the first cell and that occupy a same time domain resource are one of the N reference signal groups. In other words, reference signals that correspond to each cell and occupy a same time domain resource and that need to be measured by the terminal device are grouped into one reference signal group, and the reference signals corresponding to the cell are reference signals that need to be measured by the terminal device in the cell. The one or more reference signals included in the reference signal group obtained in this implementation correspond to a same cell. The reference signals corresponding to the cell are reference signals that need to be measured by the terminal device in the cell.

For example, the terminal device needs to measure reference signals SSB 1, SSB 2, SSB 3, SSB 4, SSB 5, and SSB 6. The SSB 1 corresponds to a cell $Y_1$, the SSB 2 corresponds to a cell $Y_2$, the SSB 3 corresponds to a cell $Y_3$, the SSB 4 corresponds to a cell $Y_4$, the SSB 5 corresponds to a cell $Y_5$, and the SSB 6 corresponds to a cell $Y_6$. That is, the SSB 1 needs to be measured to implement RRM measurement on the cell $Y_1$, the SSB 2 needs to be measured to implement RRM measurement on the cell $Y_2$, the SSB 3 needs to be measured to implement RRM measurement on the cell $Y_3$, the SSB 4 needs to be measured to implement RRM measurement on the cell $Y_4$, the SSB 5 needs to be measured to implement RRM measurement on the cell $Y_5$, and the SSB 6 needs to be measured to implement RRM measurement on the cell $Y_6$. Time domain resources occupied by the SSB 1 and the SSB 3 are the same, time domain resources occupied by the SSB 2 and the SSB 5 are the same, and time domain resources occupied by the SSB 4 and the SSB 6 are the same. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, and the SSB 6 is grouped into one reference signal group, so that six reference signal groups are obtained.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

a2: For one first reference signal group in the N reference signal groups, obtain a measurement gap configuration of the first reference signal group based on the first reference signal group. That is, the N measurement gap configurations are obtained, and each reference signal group corresponds to one measurement gap configuration.

For one first reference signal group in the N reference signal groups, the network device configures a measurement gap configuration for the first reference signal group based on configuration information of one or more reference signals included in the first reference signal group. The configuration information of the one or more reference signals includes information such as a time-frequency domain resource occupied by the one or more reference signals and a sending periodicity of the one or more reference signals. That is, the network device configures one measurement gap configuration for each reference signal group, and configures the N measurement gap configurations for the N reference signal groups, to obtain the N measurement gap configurations.

Figure 4:
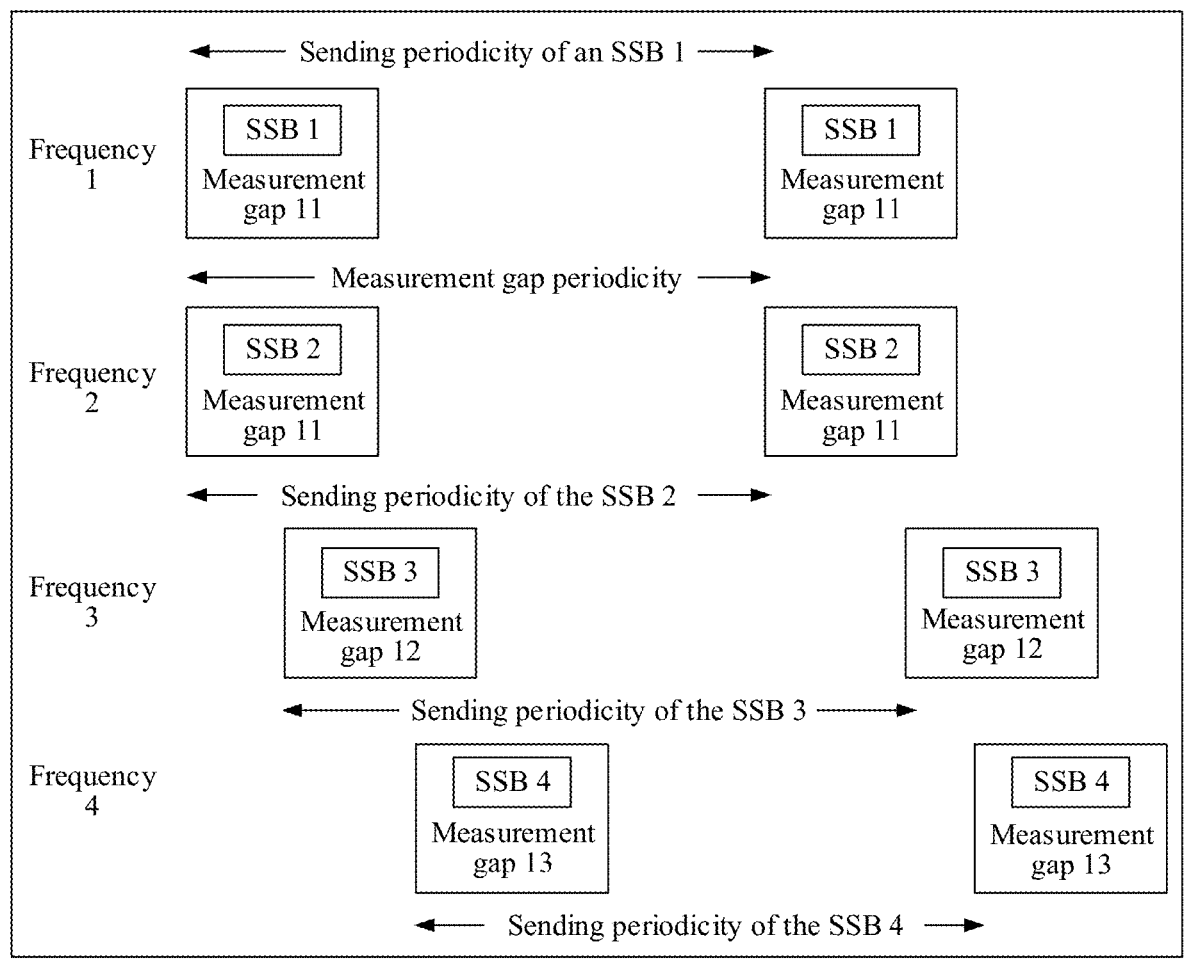
FIG. 4 is a schematic diagram 1 of a measurement gap according to an embodiment of this application.
Figure 5:
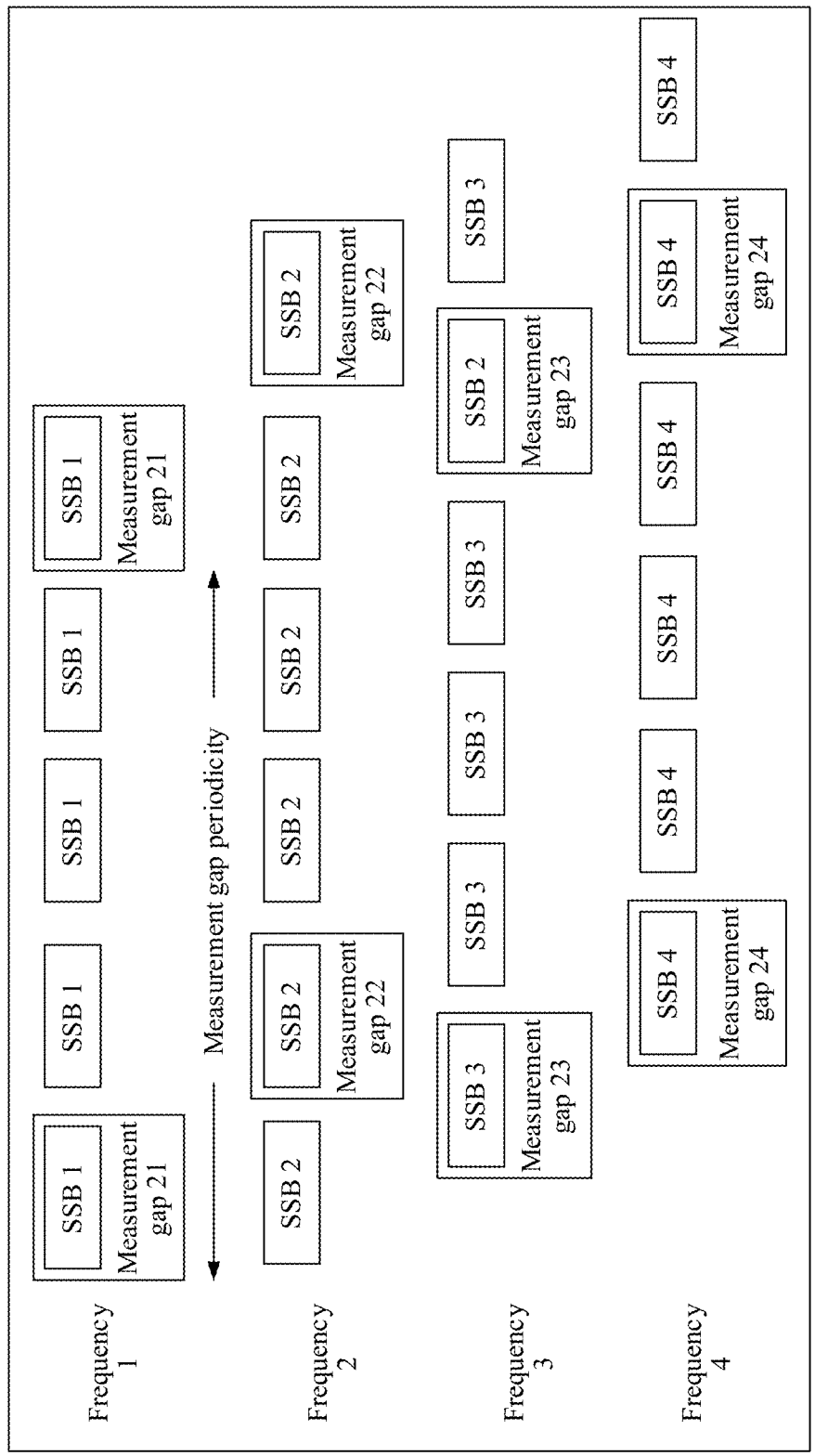
FIG. 5 is a schematic diagram 2 of a measurement gap according to an embodiment of this application.
Figure 6:
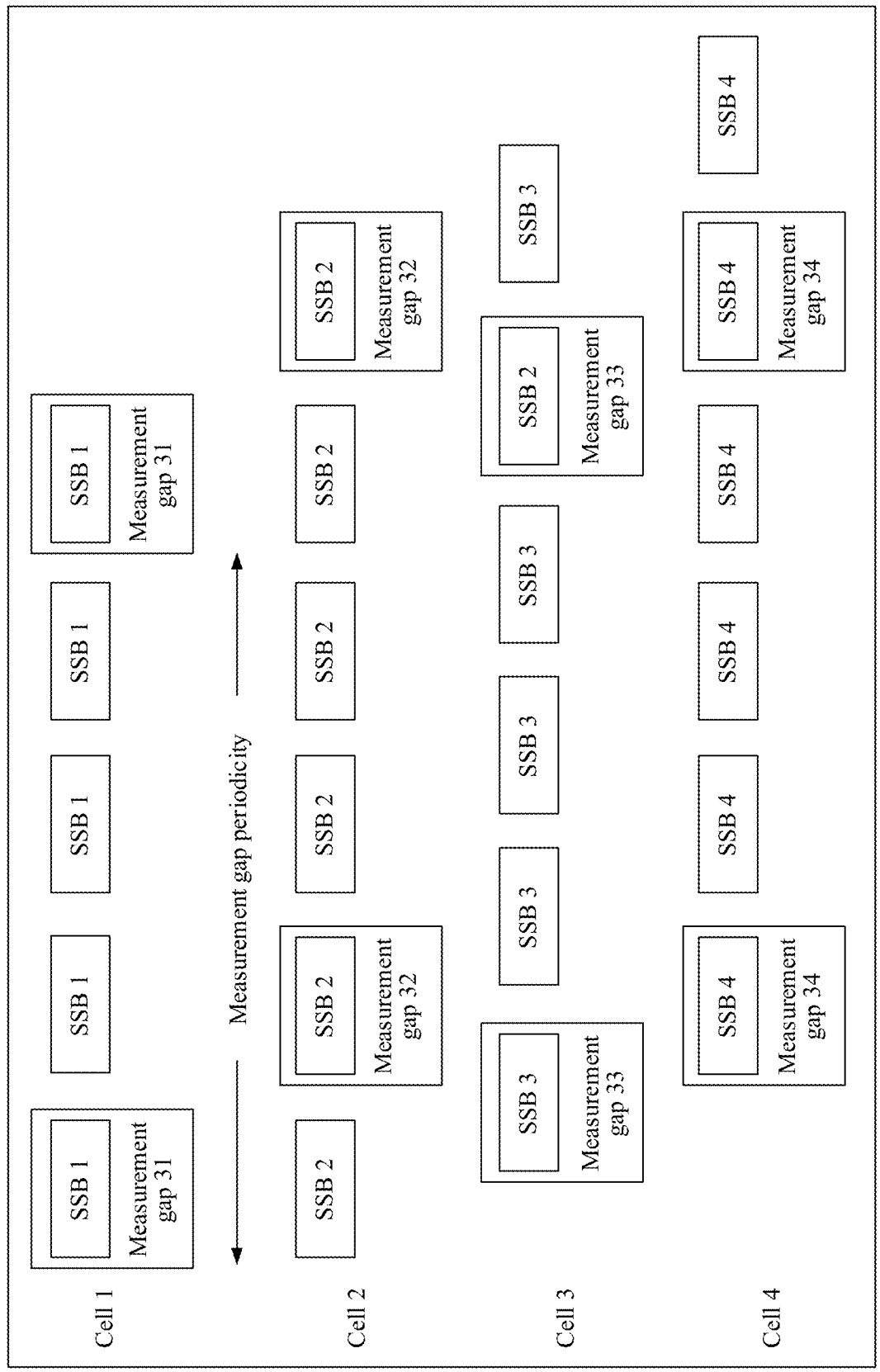
FIG. 6 is a schematic diagram 3 of a measurement gap according to an embodiment of this application.

FIG. 4 is a schematic diagram 1 of a measurement gap according to an embodiment of this application, FIG. 5 is a schematic diagram 2 of a measurement gap according to an embodiment of this application, and FIG. 6 is a schematic diagram 3 of a measurement gap according to an embodiment of this application.

FIG. 4 corresponds to Implementation 1 in operation a1: The SSB 1 and the SSB 2 occupy a same time domain resource but correspond to different frequencies, the SSB 1 and the SSB 2 are grouped into a same reference signal group and correspond to a same measurement gap configuration a, and the terminal device determines, based on the measurement gap configuration a, to measure the SSB 1 and the SSB 2 in a measurement gap 11. A time domain resource occupied by the SSB 3 is different from those occupied by the SSB 1 and the SSB 2, a frequency corresponding to the SSB 3 is also different from those corresponding to the SSB 1 and the SSB 2, the SSB 3 corresponds to a measurement gap configuration b, and the terminal device determines, based on the measurement gap configuration b, to measure the SSB 3 in a measurement gap 12. A time domain resource occupied by the SSB 4 is different from those occupied by the SSB 1, the SSB 2, and the SSB 3, a frequency corresponding to the SSB 4 is also different from those corresponding to the SSB 1, the SSB 2, and the SSB 3, the SSB 4 corresponds to a measurement gap configuration c, and the terminal device determines, based on the measurement gap configuration c, to measure the SSB 4 in a measurement gap 13.

FIG. 5 corresponds to Implementation 2 in operation a1: Frequencies respectively corresponding to the SSB 1, the SSB 2, the SSB 3, and the SSB 4 are different, time domain resources occupied by the SSB 1 and the SSB 2 are the same, measurement gap configurations respectively corresponding to the SSB 1, the SSB 2, the SSB 3, and the SSB 4 are different, and measurement gaps used by the terminal device to measure the SSB 1, the SSB 2, the SSB 3, and the SSB 4 are different, and are respectively a measurement gap 21, a measurement gap 22, a measurement gap 23, and a measurement gap 24.

FIG. 6 corresponds to Implementation 3 in operation a1: Cells respectively corresponding to the SSB 1, the SSB 2, the SSB 3, and the SSB 4 are different, time domain resources occupied by the SSB 1 and the SSB 2 are the same, measurement gap configurations respectively corresponding to the SSB 1, the SSB 2, the SSB 3, and the SSB 4 are different, and measurement gaps used by the terminal device to measure the SSB 1, the SSB 2, the SSB 3, and the SSB 4 are different, and are respectively a measurement gap 31, a measurement gap 32, a measurement gap 33, and a measurement gap 34.

It can be learned with reference to FIG. 4 to FIG. 6 that, in Implementation 2 in which the N reference signal groups are obtained, reference signals corresponding to different frequencies are not grouped into one group. Therefore, measurement gap configurations corresponding to the reference signals corresponding to frequencies are different, and measurement gaps for measuring the reference signals corresponding to the frequencies are different. In this way, the network device can precisely control a time at which the terminal device measures the frequencies. In Implementation 3 in which the N reference signal groups are obtained, reference signals in different cells are not grouped into one group. Therefore, measurement gap configurations corresponding to reference signals corresponding to cells are different, and measurement gaps for measuring the reference signals corresponding to the cells are different. In this way, the network device can precisely control a time at which the terminal device measures the cells.

a3: Generate the correspondence based on each reference signal group and the measurement gap configuration corresponding to each reference signal group.

The generated correspondence may include N pieces of indication information indicating the N measurement gap configurations, and an identifier of at least one reference signal corresponding to each measurement gap configuration. It may be understood that at least one reference signal indicated by an identifier of the at least one reference signal corresponding to one measurement gap configuration is a reference signal in a reference signal group corresponding to the measurement gap configuration.

Further, when the network device obtains the foregoing correspondence, the network device may obtain the foregoing correspondence according to a preset rule that "different measurement gap configurations are configured for reference signals that occupy different time domain resources".

When the network device obtains the correspondence, the network device may further obtain the correspondence based on a configuration request of the terminal device. The network device receives the configuration request from the terminal device, where the configuration request is used to indicate to configure different measurement gap configurations for reference signals that occupy different time domain resources; and the network device obtains the correspondence based on the configuration request. In this manner, the correspondence obtained by the network device can meet a requirement of the terminal device.

Operation S102: The network device sends the correspondence to the terminal device.

The network device may include the correspondence in any one of the following messages and send the message to the terminal device:

a radio resource control (RRC) message, a downlink control information (DCI), a media access control control element (MAC CE) message, an LTE positioning protocol (LPP) message, and an LPPa (LTE position protocol A) message.

Operation S103: For one first measurement gap configuration in the N measurement gap configurations, the terminal device measures, by using the first measurement gap configuration, one or more reference signals included in a first reference signal group corresponding to the first measurement gap configuration.

In an embodiment, the terminal device receives the correspondence to obtain the N measurement gap configurations, and for the one first measurement gap configuration in the N measurement gap configurations, the terminal device measures, based on the first measurement gap configuration, the one or more reference signals included in the first reference signal group corresponding to the first measurement gap configuration. That is, the terminal device obtains a first measurement gap based on the first measurement gap configuration, and measures, in the first measurement gap, the one or more reference signals included in the first reference signal group.

After completing the measurement, the terminal device reports a measurement result. The measurement result may include at least one of the following items: an RSRP, an RSRQ, an SINR, and an RSTD, but is not limited to the foregoing items. The terminal device obtains, based on the first measurement gap configuration and configuration information of the one or more reference signals included in the first reference signal group corresponding to the first measurement gap configuration, a reporting time corresponding to the first measurement gap configuration; and sends the measurement result to the network device at the reporting time, where the measurement result is a measurement result obtained after the one or more reference signals included in the first reference signal group are measured. That is, in a measurement gap corresponding to each measurement gap configuration, measurement results obtained through measurement may correspond to different reporting time.

Correspondingly, the network device also obtains, based on the first measurement gap configuration and the configuration information of the one or more reference signals included in the first reference signal group corresponding to the first measurement gap configuration, a receiving time corresponding to the first measurement gap configuration; and receives the measurement result at the receiving time, where the measurement result is the measurement result obtained after the one or more reference signals included in the first reference signal group are measured.

For the method in which the terminal device obtains, based on the measurement gap configuration and the configuration information of the one or more reference signals included in the reference signal group corresponding to the measurement gap configuration, the reporting time corresponding to the measurement gap configuration, refer to an existing method for obtaining the reporting time based on a measurement gap configuration and configuration information of a to-be-measured reference signal. Details are not described in this embodiment.

In this embodiment, the terminal device receives the correspondence between the N measurement gap configurations and the N reference signal groups from the network device, and reference signals included in each group of reference signals occupy a same time domain resource. In this way, the terminal device can obtain, based on a measurement gap configuration corresponding to a reference signal that occupies a specific time domain resource, a measurement gap for measuring the reference signal that occupies the time domain resource, so that the reference signals that need to be measured by the terminal device can be measured. This avoids a technical problem in the conventional technology that a part of reference signals cannot be measured because the terminal device can measure a reference signal only in one measurement gap in frequency domain.

If a dedicated measurement gap configuration for positioning measurement is configured for the terminal device, and in a protocol, it is required that the dedicated measurement gap configuration be used only for a measurement purpose of the positioning measurement and specified that when the terminal device performs the positioning measurement by using the dedicated measurement gap configuration for the positioning measurement, the terminal device cannot use a measurement gap configuration corresponding to measurement for another purpose to perform the measurement for another purpose at the same time. When both the measurement (for example, RRM measurement) for another purpose and the positioning measurement are configured for the terminal device, because the terminal device can use or maintain only one measurement gap configuration in one frequency domain, the terminal device cannot perform the measurement for another purpose while performing the positioning measurement. Consequently, the measurement for another purpose cannot be performed or is interrupted. To resolve the foregoing technical problem, a method in the following embodiments is provided.

Figure 7:
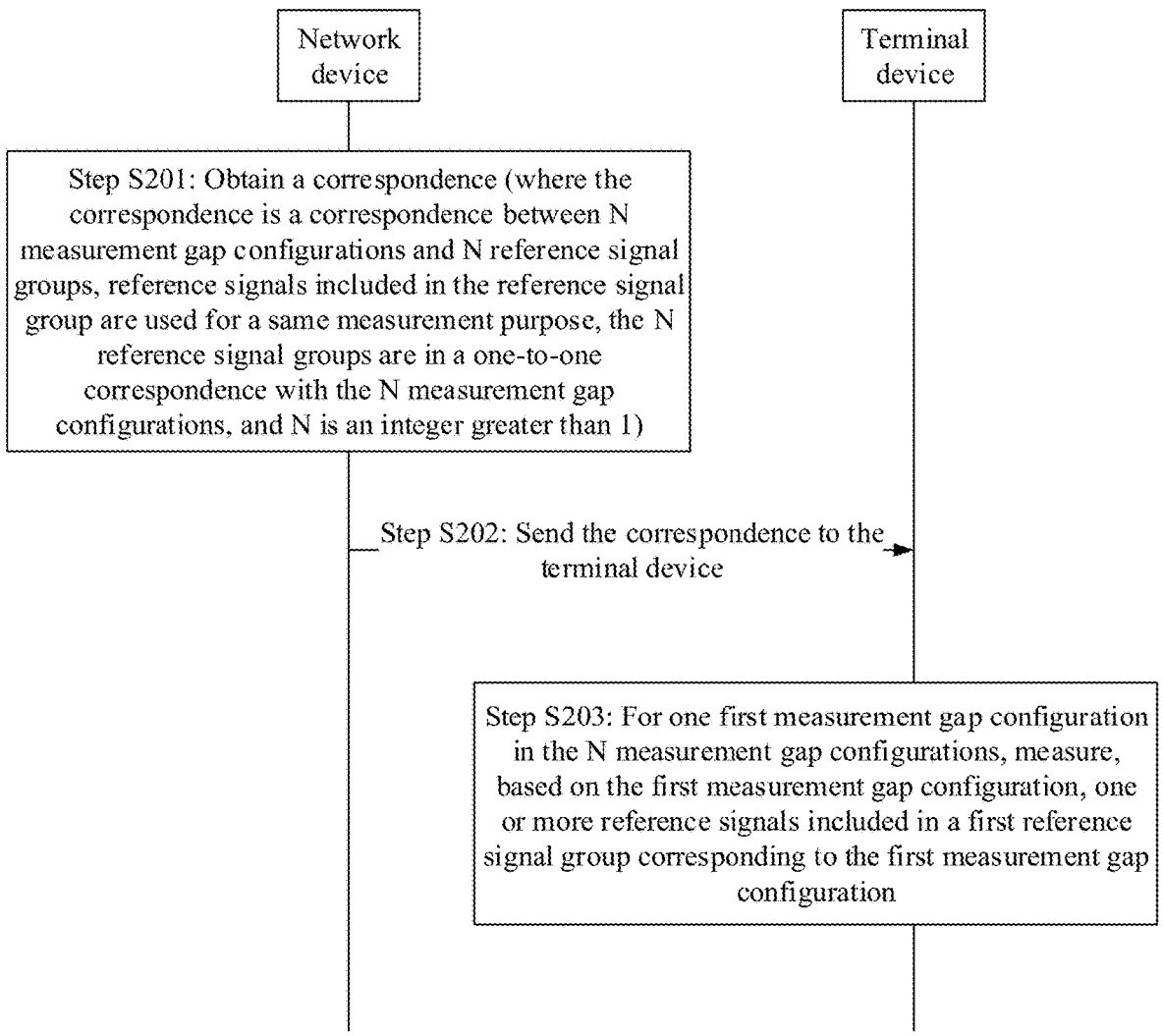
FIG. 7 is an interaction diagram 2 of a communication method according to an embodiment of this application.

FIG. 7 is an interaction diagram 2 of a communication method according to an embodiment of this application. Referring to FIG. 7, the method in this embodiment includes the following operations.

Operation S201: A network device obtains a correspondence, where the correspondence is a correspondence between N measurement gap configurations and N reference signal groups, one or more reference signals included in the reference signal group are used for a same measurement purpose, the N reference signal groups are in a one-to-one correspondence with the N measurement gap configurations, and N is an integer greater than 1.

When a terminal device needs to measure an inter-frequency cell or an inter-frequency frequency, the network device needs to configure a measurement gap configuration for the terminal device. The terminal device uses the measurement gap configuration to measure the inter-frequency cell or the inter-frequency frequency by measuring a reference signal. In this embodiment, all reference signals that need to be measured may be referred to as reference signals that need to be measured by the terminal device.

The reference signals that need to be measured by the terminal device may be at least one of the following: SSBs, PRSs, CSI-RSs, DMRSs, SRSs, and CRSs. A measurement quantity of the reference signals by the terminal device may be at least one of the following: an RSRP, an RSRQ, an SINR, and an RSTD.

That the network device obtains the correspondence includes the following operations.

b1: Obtain the N reference signal groups.

In a manner, the network device may group, based on measurement purposes for which the reference signals are used, the reference signals that need to be measured by the terminal device into N groups, to obtain the N reference signal groups. Implementations include but are not limited to the following:

Implementation 1: It is determined that reference signals that are used for a same measurement purpose and that are in the reference signals that need to be measured by the terminal device are a group of reference signals in the N reference signal groups. In other words, the reference signals that are used for the same measurement purpose and that are in the reference signals that need to be measured by the terminal device are grouped into one group, so that the N reference signal groups are obtained. The one or more reference signals included in the reference signal group obtained in this implementation correspond to one or more cells and one or more frequencies.

For example, the terminal device needs to measure reference signals SSB 1, SSB 2, SSB 3, SSB 4, SSB 5, PRS 1, PRS 2, and PRS 3. The SSB 1, the SSB 2, the SSB 3, the SSB 4, and the SSB 5 respectively correspond to frequencies $X_1$, $X_2$, $X_3$, $X_4$, and $X_5$, and the PRS 1, the PRS 2, and the PRS 3 respectively correspond to frequencies $X_1$, $X_2$, and $X_3$. The SSB 1, the SSB 2, the SSB 3, the SSB 4, and the SSB 5 are used for RRM measurement, and the PRS 1 to PRS 3 are used to implement RSTD measurement. In this case, the SSB 1, the SSB 2, the SSB 3, the SSB 4, and the SSB 5 are grouped into one reference signal group, and the PRS 1, the PRS 2, and the PRS 3 are grouped into one reference signal group.

Implementation 2: For one first frequency in frequencies corresponding to the reference signals that need to be measured by the terminal device, it is determined that reference signals that correspond to the first frequency and that are used for a same measurement purpose are one of the N reference signal groups. In other words, reference signals that correspond to each frequency and are used for a same measurement purpose and that need to be measured by the terminal device are grouped into one reference signal group. The one or more reference signals included in the reference signal group obtained in this implementation correspond to a same frequency. The frequency corresponding to the reference signals is a frequency corresponding to a frequency domain resource occupied by the reference signals.

For example, the terminal device needs to measure reference signals SSB 1, SSB 2, SSB 3, SSB 4, SSB 5, PRS 1, PRS 2, and PRS 3. The SSB 1 and the SSB 2 correspond to a frequency $X_1$, the SSB 3 and the SSB 4 correspond to a frequency $X_2$, the SSB 5 corresponds to a frequency $X_3$, and the PRS 1, the PRS 2, and the PRS 3 respectively correspond to frequencies $X_1$, $X_2$, and $X_3$. The SSB 1, the SSB 2, the SSB 3, the SSB 4, and the SSB 5 are used for RRM measurement, and the PRS 1 to PRS 3 are used to implement RSTD measurement. In this case, the SSB 1, the SSB 2, the SSB 3, the SSB 4, and the SSB 5 are grouped into one reference signal group, and the PRS 1, the PRS 2, and the PRS 3 are grouped into one reference signal group. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, the PRS 1 is grouped into one reference signal group, the PRS 2 is grouped into one reference signal group, and the PRS 3 is grouped into one reference signal group, so that eight reference signal groups are obtained.

Implementation 3: For one first cell in cells corresponding to the reference signals that need to be measured by the terminal device, it is determined that reference signals that correspond to the first cell and that are used for a same measurement purpose are one of the N reference signal groups. In other words, reference signals that correspond to each cell and are used for a same measurement purpose and that need to be measured by the terminal device are grouped into one reference signal group, and the reference signals corresponding to the cell are reference signals that need to be measured by the terminal device in the cell. The one or more reference signals included in the reference signal group obtained in this implementation correspond to a same cell.

For example, the terminal device needs to measure reference signals SSB 1, SSB 2, SSB 3, SSB 4, SSB 5, PRS 1, PRS 2, and PRS 3. The SSB 1, the SSB 2, the SSB 3, the SSB 4, and the SSB 5 respectively correspond to cells $Y_1$, $Y_2$, $Y_3$, $Y_4$, and $Y_5$, and the PRS 1, the PRS 2, and the PRS 3 respectively correspond to cells $Y_1$, $Y_2$, and $Y_3$. The SSB 1, the SSB 2, the SSB 3, the SSB 4, and the SSB 5 are used for RRM measurement, and the PRS 1 to PRS 3 are used to implement RSTD measurement. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, the PRS 1 is grouped into one reference signal group, the PRS 2 is grouped into one reference signal group, and the PRS 3 is grouped into one reference signal group, so that eight reference signal groups are obtained.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

b2: For one first reference signal group in the N reference signal groups, obtain a measurement gap configuration of the first reference signal group based on the first reference signal group. That is, the N measurement gap configurations are obtained.

For a specific implementation of this operation, refer to a2 in the embodiment shown in FIG. 3. Details are not described herein again.

Figure 8:
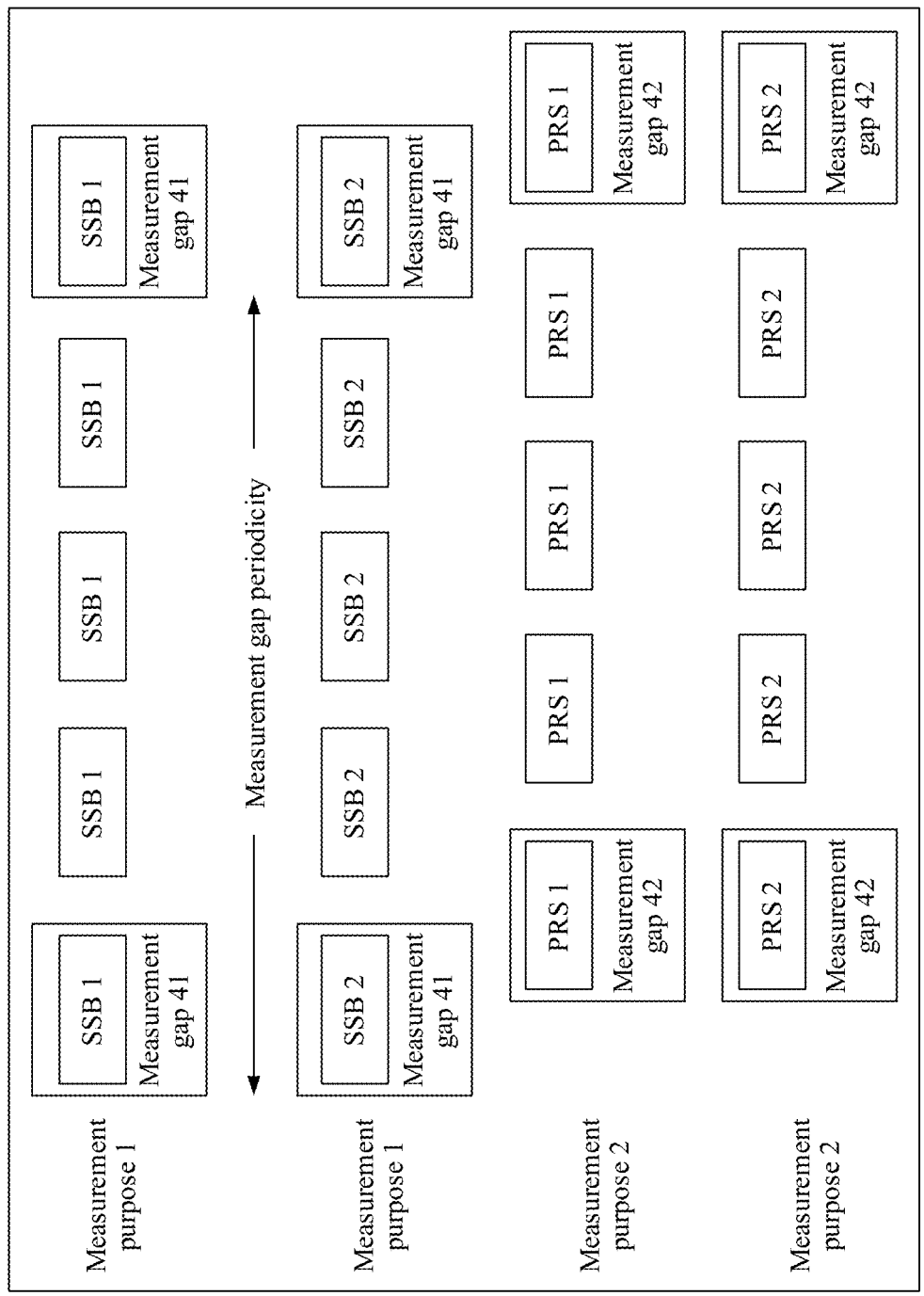
FIG. 8 is a schematic diagram 4 of a measurement gap according to an embodiment of this application.
Figure 9:
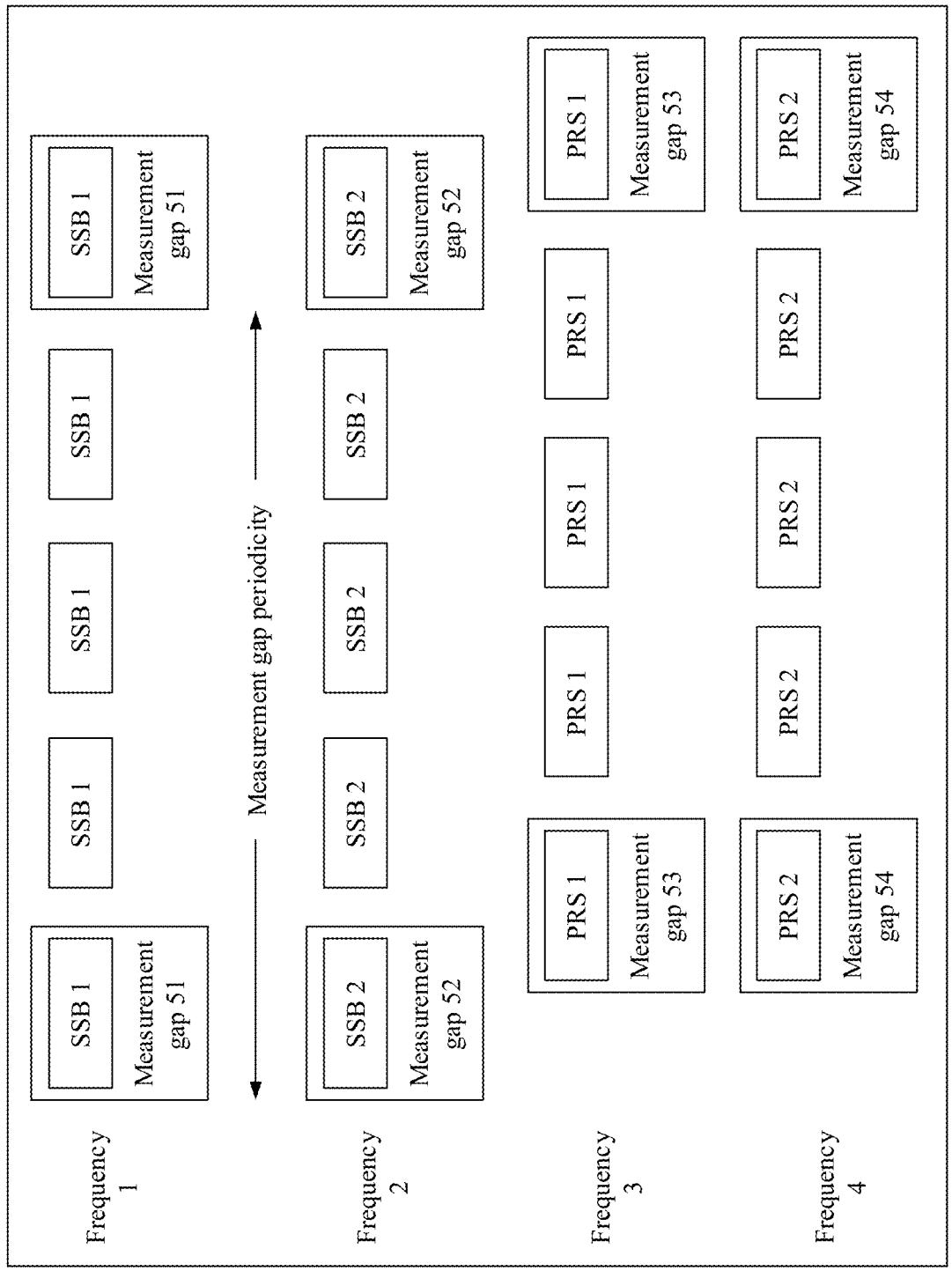
FIG. 9 is a schematic diagram 5 of a measurement gap according to an embodiment of this application.
Figure 10:
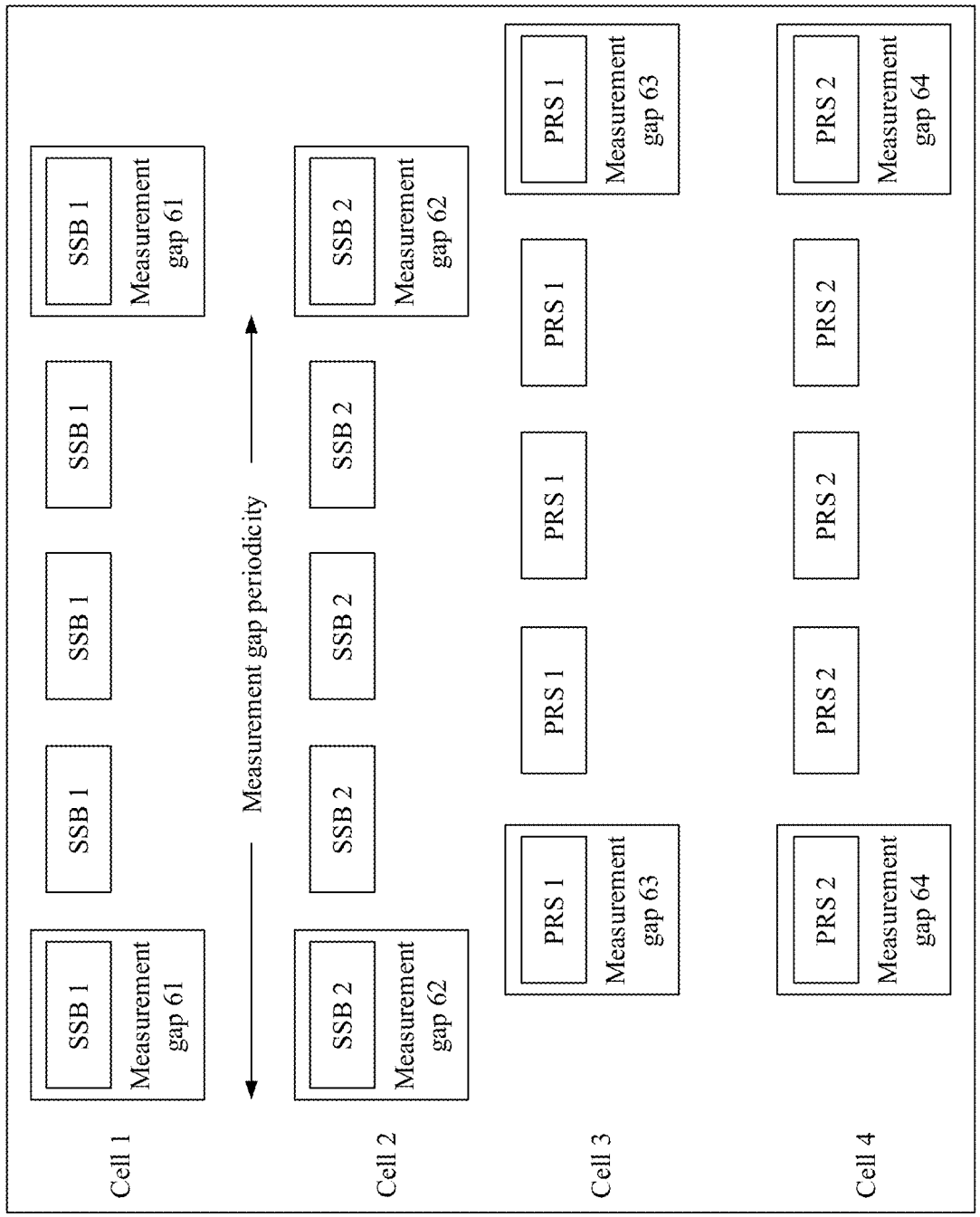
FIG. 10 is a schematic diagram 6 of a measurement gap according to an embodiment of this application.

FIG. 8 is a schematic diagram 4 of a measurement gap according to an embodiment of this application, FIG. 9 is a schematic diagram 5 of a measurement gap according to an embodiment of this application, and FIG. 10 is a schematic diagram 6 of a measurement gap according to an embodiment of this application.

FIG. 8 corresponds to Implementation 1 in operation b1: The SSB 1 and the SSB 2 are used for a same measurement purpose, the SSB 1 and the SSB 2 are grouped into a same reference signal group and correspond to a same measurement gap configuration a, and the terminal device determines, based on the measurement gap configuration a, to measure the SSB 1 and the SSB 2 in a measurement gap 41. The PRS 1 and the PRS 2 are used for a same measurement purpose, the PRS 1 and the PRS 2 are grouped into a same reference signal group and correspond to a same measurement gap configuration b, and the terminal device determines, based on the measurement gap configuration b, to measure the PRS 1 and the PRS 2 in a measurement gap 42.

FIG. 9 corresponds to Implementation 2 in operation b1: Frequencies respectively corresponding to the SSB 1 and the SSB 2 are different, frequencies respectively corresponding to the PRS 1 and the PRS 2 are different, measurement gap configurations respectively corresponding to the SSB 1, the SSB 2, the PRS 1, and the PRS 2 are different, and measurement gaps used by the terminal device to measure the SSB 1, the SSB 2, the PRS 1, and the PRS 2 are different, and are respectively a measurement gap 51, a measurement gap 52, a measurement gap 53, and a measurement gap 54.

FIG. 10 corresponds to Implementation 3 in operation b1: Cells respectively corresponding to the SSB 1 and the SSB 2 are different, cells respectively corresponding to the PRS 1 and the PRS 2 are different, measurement gap configurations respectively corresponding to the SSB 1, the SSB 2, the PRS 1, and the PRS 2 are different, and measurement gaps used by the terminal device to measure the SSB 1, the SSB 2, the PRS 1, and the PRS 2 are different, and are respectively a measurement gap 61, a measurement gap 62, a measurement gap 63, and a measurement gap 64.

It can be learned with reference to FIG. 8 to FIG. 10 that, in Implementation 2 in which the N reference signal groups are obtained, reference signals corresponding to different frequencies are not grouped into one group. Therefore, measurement gap configurations corresponding to the reference signals corresponding to frequencies are different, and measurement gaps for measuring the reference signals corresponding to the frequencies are different. In this way, the network device can precisely control a time at which the terminal device measures the frequencies. In Implementation 3 in which the N reference signal groups are obtained, reference signals in different cells are not grouped into one group. Therefore, measurement gap configurations corresponding to reference signals corresponding to cells are different, and measurement gaps for measuring the reference signals corresponding to the cells are different. In this way, the network device can precisely control a time at which the terminal device measures the cells.

b3: Generate the correspondence based on each reference signal group and the measurement gap configuration corresponding to each reference signal group.

For a specific implementation of this operation, refer to a3 in the embodiment shown in FIG. 3. Details are not described herein again.

Further, when the network device obtains the correspondence, the network device may obtain the correspondence based on a configuration request of the terminal device. The network device receives the configuration request from the terminal device, where the configuration request is used to indicate to configure different measurement gap configurations for reference signals that are used for different measurement purposes; and the network device obtains the correspondence based on the configuration request. In this manner, the correspondence obtained by the network device can meet a requirement of the terminal device.

Operation S202: The network device sends the correspondence to the terminal device.

For a specific implementation of this operation, refer to S102 in the embodiment shown in FIG. 3. Details are not described herein again.

Operation S203: For one first measurement gap configuration in the N measurement gap configurations, the terminal device measures, by using the first measurement gap configuration, one or more reference signals included in a first reference signal group corresponding to the first measurement gap configuration.

A difference between the specific implementations of this operation and operation S103 in the embodiment shown in FIG. 3 lies in that, if the reference signals that need to be measured by the terminal device include a reference signal used for RSTD measurement, an RSTD measurement result obtained by the terminal device through measurement is not only reported to the network device at a reporting time, but also reported to a positioning server. For another specific implementation of this operation, refer to descriptions in operation S103 in the embodiment shown in FIG. 3. Details are not described herein again.

In this embodiment, each group of reference signals corresponds to one measurement gap configuration, and reference signals included in each group of reference signals are used for a same measurement purpose. In this way, a measurement gap configuration is configured for all reference signals that are used for each measurement purpose, and is sent to the terminal device. In this way, the terminal device can obtain, based on a measurement gap configuration corresponding to a reference signal that is used for a specific measurement purpose, a measurement gap for measuring the reference signal that is used for the measurement purpose, so that all preset measurement purposes can be implemented. This avoids a case in which measurement for another measurement purpose is interrupted or cannot be performed because measurement for a specific measurement purpose needs to be performed.

To avoid a technical problem that can be resolved in the embodiment shown in FIG. 7 and that is caused because reference signals that occupy a same time domain resource but are used for different measurement purposes correspond to a same gap configuration, and avoid a technical problem that can be resolved in the embodiment shown in FIG. 3 and that is caused because reference signals that are used for a same measurement purpose but occupy different time domain resource correspond to a same gap configuration, improvement is further made in this embodiment based on the embodiment shown in FIG. 3 or the embodiment shown in FIG. 7.

Figure 11:
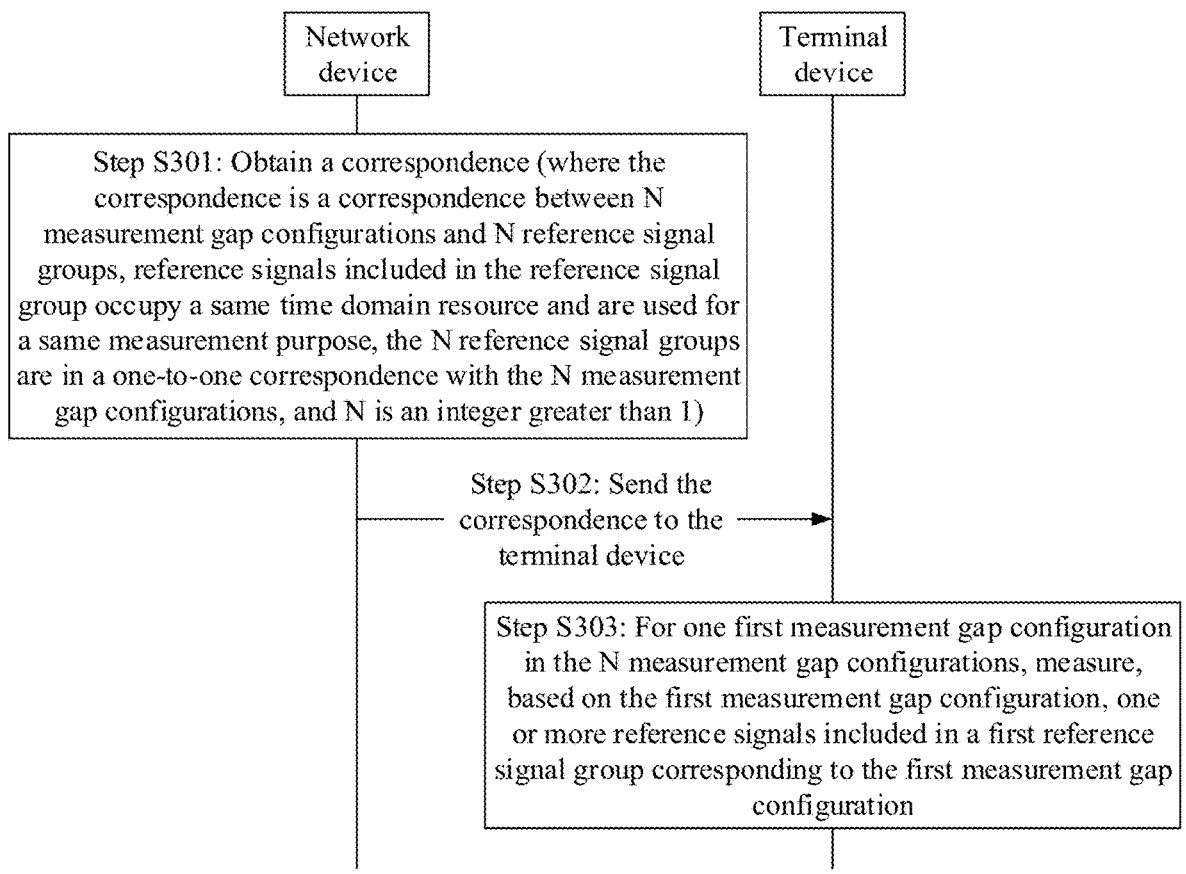
FIG. 11 is an interaction diagram 3 of a communication method according to an embodiment of this application.

FIG. 11 is an interaction diagram 3 of a communication method according to an embodiment of this application. Referring to FIG. 11, the method in this embodiment includes the following operations.

Operation S301: A network device obtains a correspondence, where the correspondence is a correspondence between N measurement gap configurations and N reference signal groups, one or more reference signals included in the reference signal group occupy a same time domain resource and are used for a same measurement purpose, the N reference signal groups are in a one-to-one correspondence with the N measurement gap configurations, and N is an integer greater than 1.

A difference between this embodiment and the embodiment shown in FIG. 3 or the embodiment shown in FIG. 7 lies in that reference signals included in each reference signal group in this embodiment not only occupy a same time domain resource, but also are used for a same measurement purpose. Correspondingly, in this embodiment, when the network device obtains the correspondence, a method for obtaining the N reference signal groups is also different from that in the embodiment shown in FIG. 3 or the embodiment shown in FIG. 7. The method for obtaining the N reference signal groups in this embodiment may be as follows:

In a manner, the network device may group, based on time domain resources occupied by reference signals and measurement purposes for which the reference signals are used, the reference signals that need to be measured by a terminal device into N groups, to obtain the N reference signal groups. Implementations include but are not limited to the following:

Implementation 1: It is determined that reference signals that occupy a same time domain resource and are used for a same measurement purpose and that are in the reference signals that need to be measured by the terminal device are a group of reference signals in the N reference signal groups. In other words, the reference signals that occupy the same time domain resource and are used for the same measurement purpose and that are in the reference signals that need to be measured by the terminal device are grouped into one group, so that the N reference signal groups are obtained.

For example, the terminal device needs to measure reference signals SSB 1, SSB 2, SSB 3, SSB 4, SSB 5, PRS 1, PRS 2, and PRS 3. The SSB 1, the SSB 2, the SSB 3, the SSB 4, and the SSB 5 respectively correspond to frequencies $X_1$, $X_2$, $X_3$, $X_4$, and $X_5$, and the PRS 1, the PRS 2, and the PRS 3 respectively correspond to frequencies $X_6$, $X_7$, and $X_8$. The SSB 1, the SSB 2, the SSB 3, the SSB 4, and the SSB 5 are used for RRM measurement, and the PRS 1 to PRS 3 are used to implement RSTD measurement. Time domain resources occupied by the SSB 1 and the SSB 3 are the same, time domain resources occupied by the SSB 2 and the SSB 4 are the same, a time domain resource occupied by the SSB 5 is different from those occupied by the SSB 1 to SSB 4, time domain resources occupied by the SSB 3 and the SSB 2 are different, time domain resources occupied by the PRS 1 and the PRS 2 are the same, time domain resources occupied by the PRS 3 and the PRS 1 are different, and time domain resources occupied by the PRS 1 and the SSB 1 are the same. In this case, the SSB 1 and the SSB 3 are grouped into one reference signal group, the SSB 2 and the SSB 4 are grouped into one reference signal group, the SSB 5 is grouped into one reference signal group, the PRS 1 and the PRS 2 are grouped into one reference signal group, and the PRS 3 is grouped into one reference signal group, so that five reference signal groups are obtained.

Implementation 2: For one first frequency in frequencies corresponding to the reference signals that need to be measured by the terminal device, it is determined that reference signals that correspond to the first frequency and that occupy a same time domain resource and are used for a same measurement purpose are one of the N reference signal groups. In other words, reference signals that correspond to each frequency, occupy a same time domain resource, and are used for a same measurement purpose and that need to be measured by the terminal device are grouped into one reference signal group.

For example, the terminal device needs to measure reference signals SSB 1, SSB 2, SSB 3, SSB 4, SSB 5, PRS 1, PRS 2, and PRS 3. The SSB 1 and the SSB 2 correspond to a frequency $X_1$, the SSB 3 and the SSB 4 correspond to a frequency $X_2$, the SSB 5 corresponds to a frequency $X_3$, and the PRS 1, the PRS 2, and the PRS 3 respectively correspond to frequencies $X_4$, $X_5$, and $X_6$. The SSB 1, the SSB 2, the SSB 3, the SSB 4, and the SSB 5 are used for RRM measurement, and the PRS 1 to PRS 3 are used to implement RSTD measurement. Time domain resources occupied by the SSB 1 and the SSB 2 are different, time domain resources occupied by the SSB 1 and the SSB 3 are the same, time domain resources occupied by the SSB 2 and the SSB 4 are the same, a time domain resource occupied by the SSB 5 is different from those occupied by the SSB 1 to SSB 4, time domain resources occupied by the PRS 1 and the PRS 2 are the same, time domain resources occupied by the PRS 3 and the PRS 1 are different, and time domain resources occupied by the PRS 1 and the SSB 1 are the same. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, the PRS 1 is grouped into one reference signal group, the PRS 2 is grouped into one reference signal group, and the PRS 3 is grouped into one reference signal group, so that eight reference signal groups are obtained.

Implementation 3: For one first cell in cells corresponding to the reference signals that need to be measured by the terminal device, it is determined that reference signals that correspond to the first cell and that occupy a same time domain resource and are used for a same measurement purpose are one of the N reference signal groups. In other words, reference signals that correspond to each cell, occupy a same time domain resource, and are used for a same measurement purpose and that need to be measured by the terminal device are grouped into one reference signal group.

For example, the terminal device needs to measure reference signals SSB 1, SSB 2, SSB 3, SSB 4, SSB 5, PRS 1, PRS 2, and PRS 3. The SSB 1, the SSB 2, the SSB 3, the SSB 4, and the SSB 5 respectively correspond to cells $Y_1$, $Y_2$, $Y_3$, $Y_4$, and $Y_5$, and the PRS 1, the PRS 2, and the PRS 3 respectively correspond to cells $Y_6$, $Y_7$, and $Y_8$. The SSB 1, the SSB 2, the SSB 3, the SSB 4, and the SSB 5 are used for RRM measurement, and the PRS 1 to PRS 3 are used to implement RSTD measurement. Time domain resources occupied by the SSB 1 and the SSB 2 are different, time domain resources occupied by the SSB 1 and the SSB 3 are the same, time domain resources occupied by the SSB 2 and the SSB 4 are the same, a time domain resource occupied by the SSB 5 is different from those occupied by the SSB 1 to SSB 4, time domain resources occupied by the PRS 1 and the PRS 2 are the same, time domain resources occupied by the PRS 3 and the PRS 1 are different, and time domain resources occupied by the PRS 1 and the SSB 1 are the same. In this case, the SSB 1 is grouped into one reference signal group, the SSB 2 is grouped into one reference signal group, the SSB 3 is grouped into one reference signal group, the SSB 4 is grouped into one reference signal group, the SSB 5 is grouped into one reference signal group, the PRS 1 is grouped into one reference signal group, the PRS 2 is grouped into one reference signal group, and the PRS 3 is grouped into one reference signal group, so that eight reference signal groups are obtained.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

Further, when the network device obtains the foregoing correspondence, the network device may obtain the foregoing correspondence according to a preset rule that different measurement gap configurations are configured for reference signals that occupy different time domain resources and different measurement gap configurations are configured for reference signals that are used for different measurement purposes.

When the network device obtains the correspondence, the network device may further obtain the correspondence based on a configuration request of the terminal device. The network device receives the configuration request from the terminal device, where the configuration request is used to indicate to configure different measurement gap configurations for reference signals that occupy different time domain resources and/or different measurement gap configurations for reference signals that are used for different measurement purposes; and the network device obtains the correspondence based on the configuration request. In this manner, the correspondence obtained by the network device can meet a requirement of the terminal device.

It may be understood that, if the configuration request is used to indicate to configure different measurement gap configurations for the reference signals that occupy different time domain resources, a rule that different measurement gap configurations are configured for the reference signals that are used for different measurement purposes is preset by the network device. If the configuration request is used to indicate to configure different measurement gap configurations for the reference signals that are used for different measurement purposes, a rule that different measurement gap configurations are configured for the reference signals that occupy different time domain resources is preset by the network device. If the network device neither presets a rule that different measurement gap configurations are configured for the reference signals that are used for different measurement purposes, nor presets a rule that different measurement gap configurations are configured for the reference signals that occupy different time domain resources, the configuration request may be used to indicate to configure different measurement gap configurations for the reference signals that occupy different time domain resources and different measurement gap configurations for the reference signals that are used for different measurement purposes.

For another specific implementation of operation S301, refer to descriptions in operation S101 in the embodiment shown in FIG. 3. Details are not described again in this embodiment.

Operation S302: The network device sends the correspondence to the terminal device.

For the specific implementation, refer to descriptions in operation S102 in the embodiment shown in FIG. 3. Details are not described again in this embodiment.

Operation S303: For one first measurement gap configuration in the N measurement gap configurations, measure, based on the first measurement gap configuration, one or more reference signals included in a first reference signal group corresponding to the first measurement gap configuration.

For the specific implementation, refer to descriptions in operation S103 in the embodiment shown in FIG. 3. Details are not described again in this embodiment.

In this embodiment, because the reference signals that occupy the same time domain resource and are used for the same measurement purpose are grouped into one group, not only all the reference signals that need to be measured by the terminal device can be measured, but also the terminal device can simultaneously perform measurement for all preset measurement purposes. This avoids a case in which measurement for another measurement purpose is interrupted or cannot be performed when measurement for a specific measurement purpose is performed.

Figure 12:
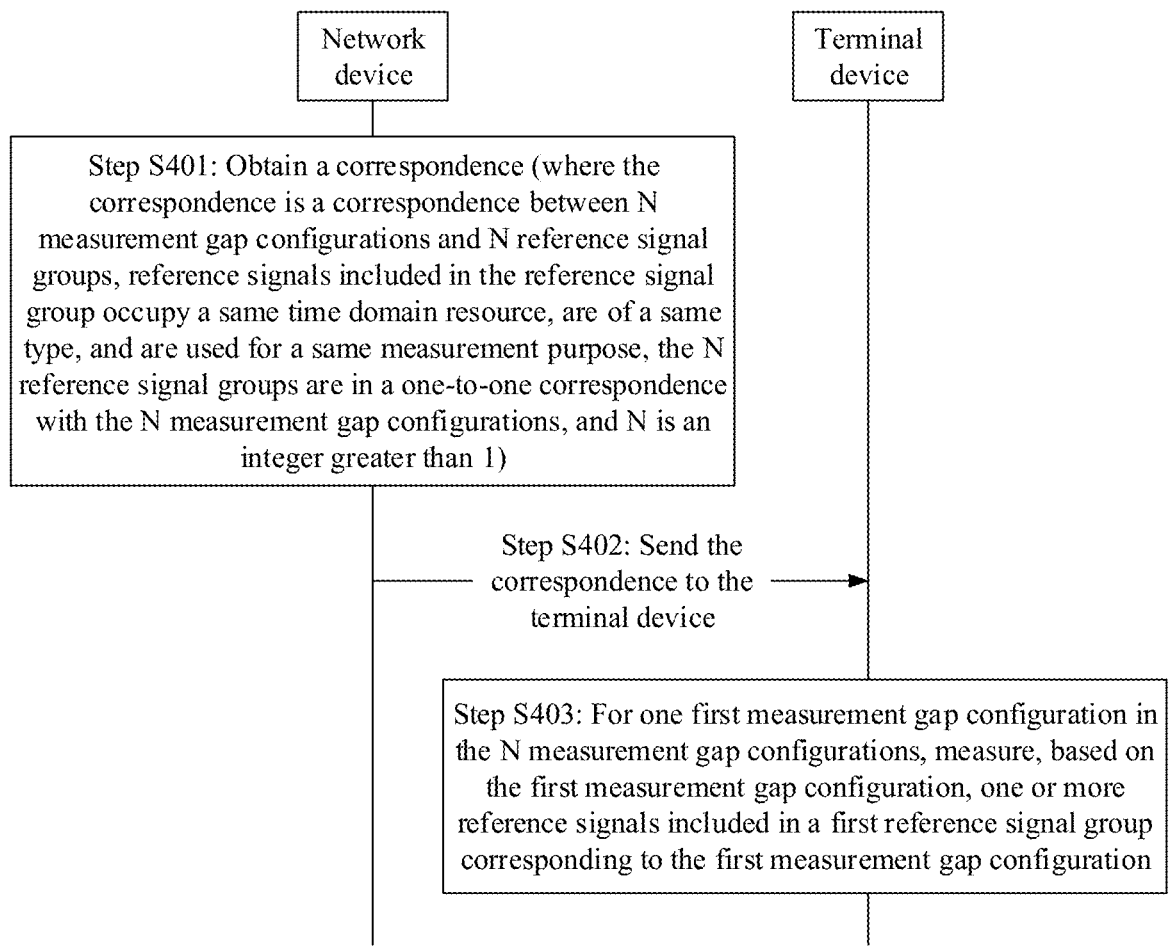
FIG. 12 is an interaction diagram 4 of a communication method according to an embodiment of this application.

Because the reference signals that occupy the same time domain resource and are used for the same measurement purpose may be of different types, if reference signals of different types are grouped into one reference signal group, and reference signals included in one reference signal group correspond to a same measurement gap configuration, the reference signals of different types may correspond to a same measurement gap configuration. In addition, a reporting time of a measurement result is related to the measurement gap configuration. If the reference signals of different types correspond to a same measurement gap configuration, there is a problem that a reporting time cannot well comply with a property of at least one reference signal in one reference signal group. To resolve the foregoing technical problem, improvement is further made in this embodiment based on the embodiment shown in FIG. 11. FIG. 12 is an interaction diagram 4 of a communication method according to an embodiment of this application. Referring to FIG. 12, the method in this embodiment includes the following operations.

Operation S401: A network device obtains a correspondence, where the correspondence is a correspondence between N measurement gap configurations and N reference signal groups, one or more reference signals included in the reference signal group occupy a same time domain resource, are of a same type, and are used for a same measurement purpose, the N reference signal groups are in a one-to-one correspondence with the N measurement gap configurations, and N is an integer greater than 1.

A difference between this embodiment and the embodiment shown in FIG. 11 lies in that reference signals included in each reference signal group in this embodiment occupy a same time domain resource, are used for a same measurement purpose, and are of a same type. Correspondingly, in this embodiment, when the network device obtains the correspondence, a method for obtaining the N reference signal groups is also different from that in the embodiment shown in FIG. 11. The method for obtaining the N reference signal groups in this embodiment may be as follows:

In a manner, the network device may group, based on time domain resources occupied by reference signals, measurement purposes for which the reference signals are used, and types of the reference signals, the reference signals that need to be measured by a terminal device into N groups, to obtain the N reference signal groups. Implementations include but are not limited to the following:

Implementation 1: It is determined that reference signals that occupy a same time domain resource, are used for a same measurement purpose, and are of a same type and that are in the reference signals that need to be measured by the terminal device are a group of reference signals in the N reference signal groups. In other words, the reference signals that occupy the same time domain resource, are used for the same measurement purpose, and are of the same type and that are in the reference signals that need to be measured by the terminal device are grouped into one group, so that the N reference signal groups are obtained.

Implementation 2: For one first frequency in frequencies corresponding to the reference signals that need to be measured by the terminal device, it is determined that reference signals that correspond to the first frequency and that occupy a same time domain resource, are used for a same measurement purpose, and are of a same type are one of the N reference signal groups. In other words, reference signals that correspond to each frequency, occupy a same time domain resource, are used for a same measurement purpose, and are of a same type and that need to be measured by the terminal device are grouped into one reference signal group.

Implementation 3: For one first cell in cells corresponding to the reference signals that need to be measured by the terminal device, it is determined that reference signals that correspond to the first cell and that occupy a same time domain resource, are used for a same measurement purpose, and are of a same type are one of the N reference signal groups. In other words, reference signals that correspond to each cell, occupy a same time domain resource, are used for a same measurement purpose, and are of a same type and that need to be measured by the terminal device are grouped into one reference signal group.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

Further, when the network device obtains the foregoing correspondence, the network device may obtain the foregoing correspondence according to a preset rule that different measurement gap configurations are configured for reference signals that are used for different measurement purposes, different measurement gap configurations are configured for reference signals that occupy different time domain resources, and different measurement gap configurations are configured for reference information that is used for different measurement purposes.

When the network device obtains the correspondence, the network device may further obtain the correspondence based on a configuration request of the terminal device. The network device receives the configuration request from the terminal device, where the configuration request is used to indicate to configure different measurement gap configurations for reference signals that occupy different time domain resources and/or different measurement gap configurations for reference information that is used for different measurement purposes and/or different measurement gap configurations for reference signals of different types; and the network device obtains the correspondence based on the configuration request. In this manner, the correspondence obtained by the network device can meet a requirement of the terminal device.

It may be understood that, if the configuration request is used to indicate to configure different measurement gap configurations for the reference signals that occupy different time domain resources and different measurement gap configurations for the reference information that is used for different measurement purposes, a rule that different measurement gap configurations are configured for the reference signals of different types may be preset by the network device. If the configuration request is used to indicate to configure different measurement gap configurations for the reference signals of different types and different measurement gap configurations for the reference information that is used for different measurement purposes, a rule that different measurement gap configurations are configured for the reference signals that occupy different time domain resources is preset by the network device. If the configuration request may be used to indicate to configure different measurement gap configurations for the reference signals of different types and different measurement gap configurations for the reference signals that occupy different time domain resources, a rule that different measurement gap configurations are configured for the reference information that is used for different measurement purposes may be preset on a network device side.

If the configuration request is used to indicate to configure different measurement gap configurations for the reference information that is used for different measurement purposes, a rule that different measurement gap configurations are configured for the reference signals that occupy different time domain resources and different measurement gap configurations are configured for the reference signals of different types may be preset by the network device. If the configuration request may be used to indicate to configure different measurement gap configurations for the reference signals that occupy different time domain resources, a rule that different measurement gap configurations are configured for the reference signals that are used for different measurement purposes and different measurement gap configurations are configured for the reference signals of different types may be preset by the network device. If the configuration request may be used to indicate to configure different measurement gap configurations for the reference signals of different types, a rule that different measurement gap configurations are configured for the reference information that is used for different measurement purposes and different measurement gap configurations are configured for the reference signals that occupy different time domain resources may be preset by the network device.

If the network device does not preset a rule that different measurement gap configurations are configured for the reference signals of different types, does not preset a rule that different measurement gap configurations are configured for the reference signals that occupy different time domain resources, and does not preset a rule that different measurement gap configurations are configured for the reference information that is used for different measurement purposes, the configuration request may be used to indicate to configure different measurement gap configurations for the reference signals that occupy different time domain resources, different measurement gap configurations for the reference signals of different types, and different measurement gap configurations for the reference information that is used for different measurement purposes.

For another specific implementation of operation S401, refer to descriptions in operation S101 in the embodiment shown in FIG. 3. Details are not described again in this embodiment.

Operation S402: The network device sends the correspondence to the terminal device.

For the specific implementation, refer to descriptions in operation S102 in the embodiment shown in FIG. 3. Details are not described again in this embodiment.

Operation S403: For one first measurement gap configuration in the N measurement gap configurations, measure, based on the first measurement gap configuration, one or more reference signals included in a first reference signal group corresponding to the first measurement gap configuration.

For the specific implementation, refer to descriptions in operation S103 in the embodiment shown in FIG. 3. Details are not described again in this embodiment.

In this embodiment, the reference signals that occupy the same time domain resource, are used for the same measurement purpose, and are of the same type are grouped into one group, not only all the reference signals that need to be measured by the terminal device can be measured, but also the terminal device can simultaneously perform measurement for all preset measurement purposes. In addition, a reporting time of a measurement result obtained after a specific type of reference signal is measured can well comply with a property of the type of reference signal.

Figure 13:
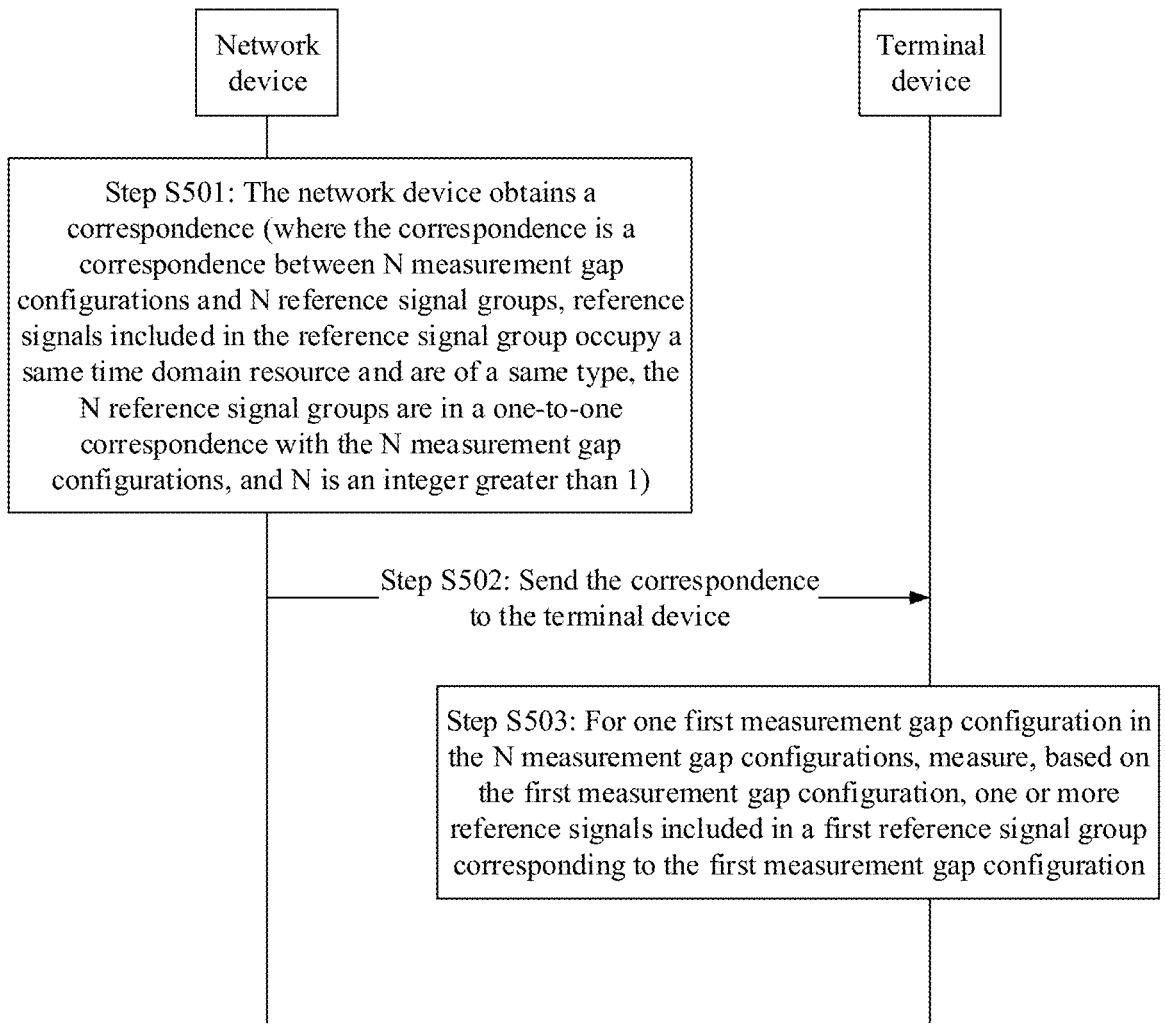
FIG. 13 is an interaction diagram 5 of a communication method according to an embodiment of this application.
Figure 14:
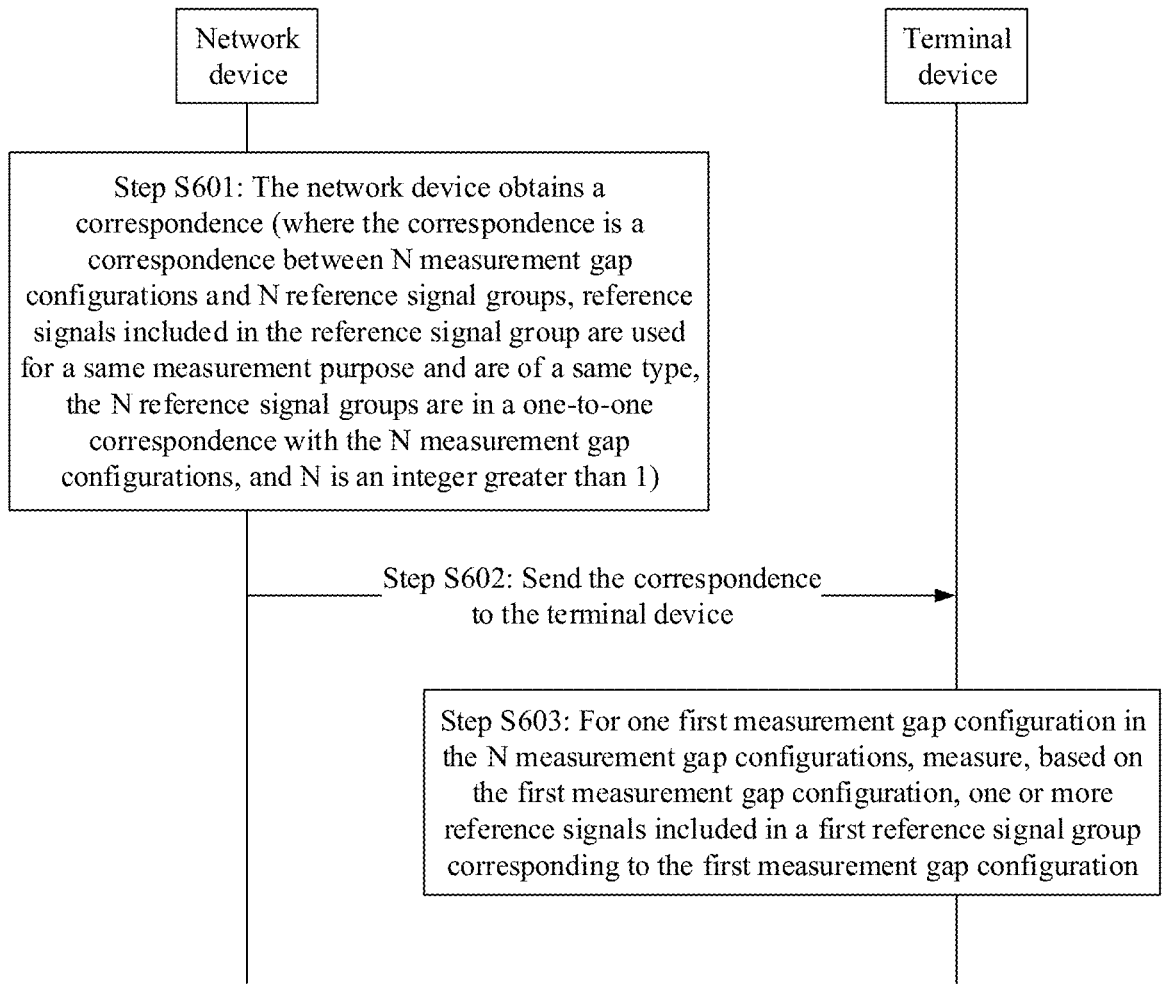
FIG. 14 is an interaction diagram 6 of a communication method according to an embodiment of this application.

The following describes, with reference to FIG. 13 and FIG. 14, another two communication methods provided in the embodiments of this application.

FIG. 13 is an interaction diagram 5 of a communication method according to an embodiment of this application. Referring to FIG. 13, the method in this embodiment includes the following operations.

Operation S501: A network device obtains a correspondence, where the correspondence is a correspondence between N measurement gap configurations and N reference signal groups, one or more reference signals included in the reference signal group occupy a same time domain resource and are of a same type, the N reference signal groups are in a one-to-one correspondence with the N measurement gap configurations, and N is an integer greater than 1.

A difference between this embodiment and the embodiment shown in FIG. 3 lies in that reference signals included in each reference signal group in this embodiment not only occupy a same time domain resource, but also are of a same type. Correspondingly, in this embodiment, when the network device obtains the correspondence, a method for obtaining the N reference signal groups is also different from that in the foregoing embodiment. The method for obtaining the N reference signal groups in this embodiment may be as follows:

In a manner, the network device may group, based on time domain resources occupied by reference signals and types of the reference signals, the reference signals that need to be measured by a terminal device into N groups, to obtain the N reference signal groups. Implementations include but are not limited to the following:

Implementation 1: It is determined that reference signals that occupy a same time domain resource and are of a same type and that are in the reference signals that need to be measured by the terminal device are a group of reference signals in the N reference signal groups. In other words, the reference signals that occupy the same time domain resource and are of the same type and that are in the reference signals that need to be measured by the terminal device are grouped into one group, so that the N reference signal groups are obtained.

Implementation 2: For one first frequency in frequencies corresponding to the reference signals that need to be measured by the terminal device, it is determined that reference signals that correspond to the first frequency and that occupy a same time domain resource and are of a same type are one of the N reference signal groups. In other words, reference signals that correspond to each frequency, occupy a same time domain resource, and are of a same type and that need to be measured by the terminal device are grouped into one reference signal group.

Implementation 3: For one first cell in cells corresponding to the reference signals that need to be measured by the terminal device, it is determined that reference signals that correspond to the first cell and that occupy a same time domain resource and are of a same type are one of the N reference signal groups. In other words, reference signals that correspond to each cell, occupy a same time domain resource, and are of a same type and that need to be measured by the terminal device are grouped into one reference signal group.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

Further, when the network device obtains the foregoing correspondence, the network device may obtain the foregoing correspondence according to a preset rule that different measurement gap configurations are configured for reference signals of different types and different measurement gap configurations are configured for reference signals that occupy different time domain resources.

When the network device obtains the correspondence, the network device may obtain the correspondence based on a configuration request sent by the terminal device. The network device receives the configuration request from the terminal device, where the configuration request is used to indicate to configure different measurement gap configurations for reference signals that occupy different time domain resources and/or different measurement gap configurations for reference signals of different types; and the network device obtains the correspondence based on the configuration request. In this manner, the correspondence obtained by the network device can meet a requirement of the terminal device.

It may be understood that, if the configuration request is used to indicate to configure different measurement gap configurations for the reference signals that occupy different time domain resources, a rule that different measurement gap configurations are configured for the reference signals of different types may be preset by the network device. If the configuration request is used to indicate to configure different measurement gap configurations for the reference signals of different types, a rule that different measurement gap configurations are configured for the reference signals that occupy different time domain resources may be preset by the network device. If the network device neither presets a rule that different measurement gap configurations are configured for the reference signals of different types, nor presets a rule that different measurement gap configurations are configured for the reference signals that occupy different time domain resources, the configuration request may be used to indicate to configure different measurement gap configurations for the reference signals that occupy different time domain resources and different measurement gap configurations for the reference signals of different types.

For another specific implementation of operation S501, refer to descriptions in operation S101 in the embodiment shown in FIG. 3. Details are not described again in this embodiment.

Operation S502: The network device sends the correspondence to the terminal device.

For the specific implementation, refer to descriptions in operation S102 in the embodiment shown in FIG. 3. Details are not described again in this embodiment.

Operation S503: For one first measurement gap configuration in the N measurement gap configurations, measure, based on the first measurement gap configuration, one or more reference signals included in a first reference signal group corresponding to the first measurement gap configuration.

For the specific implementation, refer to descriptions in operation S103 in the embodiment shown in FIG. 3. Details are not described again in this embodiment.

In this embodiment, the reference signals that occupy the same time domain resource and are of the same type are grouped into one group, not only all the reference signals that need to be measured by the terminal device can be measured, but also a reporting time of a measurement result obtained after a specific type of reference signal is measured can well comply with a property of the type of reference signal.

FIG. 14 is an interaction diagram 6 of a communication method according to an embodiment of this application. Referring to FIG. 14, the method in this embodiment includes the following operations.

Operation S601: A network device obtains a correspondence, where the correspondence is a correspondence between N measurement gap configurations and N reference signal groups, one or more reference signals included in the reference signal group are used for a same measurement purpose and are of a same type, the N reference signal groups are in a one-to-one correspondence with the N measurement gap configurations, and N is an integer greater than 1.

A difference between this embodiment and the embodiment shown in FIG. 4 lies in that reference signals included in each reference signal group in this embodiment are not only used for a same measurement purpose, but also are of a same type. Correspondingly, in this embodiment, when the network device obtains the correspondence, a method for obtaining the N reference signal groups is also different from that in the foregoing embodiment. The method for obtaining the N reference signal groups in this embodiment may be as follows:

In a manner, the network device may group, based on measurement purposes for which reference signals are used and types of the reference signals, the reference signals that need to be measured by a terminal device into N groups, to obtain the N reference signal groups. Implementations include but are not limited to the following:

Implementation 1: It is determined that reference signals that are used for a same measurement purpose and are of a same type and that are in the reference signals that need to be measured by the terminal device are a group of reference signals in the N reference signal groups. In other words, the reference signals that are used for the same measurement purpose and are of the same type and that are in the reference signals that need to be measured by the terminal device are grouped into one group, so that the N reference signal groups are obtained.

Implementation 2: For one first frequency in frequencies corresponding to the reference signals that need to be measured by the terminal device, it is determined that reference signals that correspond to the first frequency and that are used for a same measurement purpose and are of a same type are one of the N reference signal groups. In other words, the reference signals that correspond to each frequency, are used for a same measurement purpose, and are of a same type and that need to be measured by the terminal device are grouped into one reference signal group. The reference signals corresponding to the frequency or the frequency corresponding to the reference signals is a frequency corresponding to a frequency domain resource occupied by the reference signals.

Implementation 3: For one first cell in cells corresponding to the reference signals that need to be measured by the terminal device, it is determined that reference signals that correspond to the first cell and that are used for a same measurement purpose and are of a same type are one of the N reference signal groups. In other words, reference signals that correspond to each cell, are used for a same measurement purpose, and are of a same type and that need to be measured by the terminal device are grouped into one reference signal group, and the reference signals corresponding to the cell are reference signals that need to be measured by the terminal device in the cell.

In another manner, the network device may receive grouping information from a core network device, where the grouping information is used to indicate the N reference signal groups. The grouping information may include identifiers of a plurality of reference signals, and information indicating that reference signals indicated by specific identifiers are a group. It may be understood that, in this manner, the core network device groups the reference signals that need to be measured by the terminal device into the N reference signal groups. For a grouping method, refer to the method for obtaining the N reference signal groups by the network device in this embodiment.

Further, when the network device obtains the foregoing correspondence, the network device may obtain the foregoing correspondence according to a preset rule that different measurement gap configurations are configured for reference signals that are used for different measurement purposes and different measurement gap configurations are configured for reference signals of different types.

The network device may further obtain the correspondence based on a configuration request of the terminal device. The network device receives the configuration request from the terminal device, where the configuration request is used to indicate to configure different measurement gap configurations for reference signals that are used for different measurement purposes and/or different measurement gap configurations for reference signals of different types; and the network device obtains the correspondence based on the configuration request. In this manner, the correspondence obtained by the network device can meet a requirement of the terminal device.

It may be understood that, if the configuration request is used to indicate to configure different measurement gap configurations for the reference signals that are used for different measurement purposes, a rule that different measurement gap configurations are configured for the reference signals of different types may be preset by the network device. If the configuration request may be used to indicate to configure different measurement gap configurations for the reference signals of different types, a rule that different measurement gap configurations are configured for the reference signals that are used for different measurement purposes are preset by the network device. If the network device neither presets a rule that different measurement gap configurations are configured for the reference signals of different types, nor presets a rule that different measurement gap configurations are configured for the reference signals that are used for different measurement purposes, the configuration request may be used to indicate to configure different measurement gap configurations for the reference signals that are used for different measurement purposes and different measurement gap configurations for the reference signals of different types.

For another specific implementation of operation S601, refer to descriptions in operation S201 in the embodiment shown in FIG. 7. Details are not described again in this embodiment.

Operation S602: The network device sends the correspondence to the terminal device.

For the specific implementation, refer to descriptions in operation S202 in the embodiment shown in FIG. 7. Details are not described again in this embodiment.

Operation S603: For one first measurement gap configuration in the N measurement gap configurations, measure, based on the first measurement gap configuration, one or more reference signals included in a first reference signal group corresponding to the first measurement gap configuration.

For the specific implementation, refer to descriptions in operation S203 in the embodiment shown in FIG. 7. Details are not described again in this embodiment.

In this embodiment, the reference signals that are used for the same measurement purpose and are of the same type are grouped into one group, not only the terminal device can simultaneously perform measurement for all preset measurement purposes, but also a reporting time of a measurement result obtained after a specific type of reference signal is measured can well comply with a property of the type of reference signal.

The foregoing describes the communication methods provided in the embodiments of this application, and the following describes a terminal device and a network device provided in the embodiments of this application.

Figure 15:
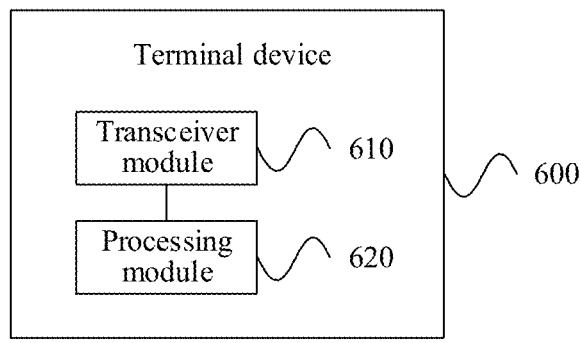
FIG. 15 is a schematic block diagram of a terminal device according to an embodiment of this application.

FIG. 15 is a schematic block diagram of a terminal device according to an embodiment of this application. The terminal device 600 in this embodiment includes:

a transceiver module 610, configured to receive a correspondence from a network device, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1; and a processing module 620, configured to: for one first measurement gap configuration in the N measurement gap configurations, measure, based on the first measurement gap configuration, one or more reference signals included in a first reference signal group corresponding to the first measurement gap configuration.

In this application, the terminal device receives the correspondence between the N measurement gap configurations and the N reference signal groups from the network device, and reference signals included in each group of reference signals occupy a same time domain resource. In this way, the terminal device can obtain, based on a measurement gap configuration corresponding to a reference signal that occupies a specific time domain resource, a measurement gap for measuring the reference signal that occupies the time domain resource, so that reference signals that need to be measured by the terminal device can be measured. This avoids a technical problem in the conventional technology that a part of reference signals cannot be measured because the terminal device can measure a reference signal only in one measurement gap in frequency domain.

Optionally, in an embodiment, the one or more reference signals included in the reference signal group are used for a same measurement purpose and/or are of a same type.

Optionally, in an embodiment, the one or more reference signals included in the reference signal group correspond to a same frequency; or the one or more reference signals included in the reference signal group correspond to a same cell; or the one or more reference signals included in the reference signal group correspond to a plurality of cells; or the one or more reference signals included in the reference signal group correspond to a plurality of frequencies.

Optionally, in an embodiment, the processing module 620 is further configured to: before receiving the correspondence from the network device, send a configuration request to the network device, where the configuration request is used to indicate to configure different measurement gap configurations for reference signals that occupy different time domain resources.

Optionally, when the one or more reference signals included in the reference signal group are used for the same measurement purpose, the configuration request is further used to indicate to configure different measurement gap configurations for reference signals that are used for different measurement purposes.

Optionally, when the one or more reference signals included in the reference signal group are of the same type, the configuration request is further used to indicate to configure different measurement gap configurations for reference signals of different types.

Optionally, in an embodiment, the processing module 620 is further configured to obtain, based on the first measurement gap configuration and configuration information of the one or more reference signals included in the first reference signal group, a reporting time corresponding to the first measurement gap configuration; and the transceiver module is further configured to send a measurement result to the network device at the reporting time, where the measurement result is a measurement result obtained after the one or more reference signals included in the first reference signal group are measured.

It should be understood that the processing module 620 in this embodiment of this application may be implemented by a processor or a processor-related circuit component, and the transceiver module 610 may be implemented by a transceiver or a transceiver-related circuit component.

Figure 16:
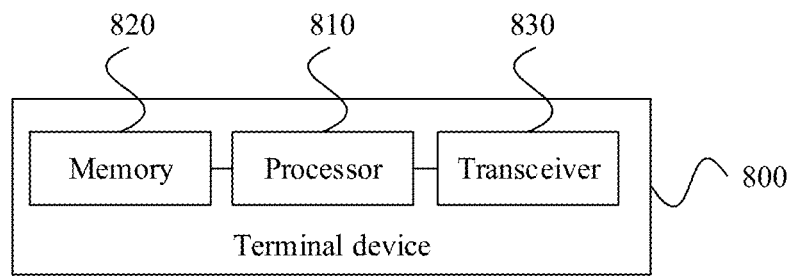
FIG. 16 is another schematic block diagram of a terminal device according to an embodiment of the present invention.

As shown in FIG. 16, an embodiment of this application further provides a terminal device 800. The terminal device 800 includes a processor 810, a memory 820, and a transceiver 830. The memory 820 stores instructions or a program, and the processor 810 is configured to execute the instructions or the program stored in the memory 820. When the instructions stored in the memory 820 are executed or the program stored in the memory 820 is executed, the processor 810 is configured to perform an operation performed by the processing module 620 in the foregoing embodiment, and the transceiver 830 is configured to perform an operation performed by the transceiver module 610 in the foregoing embodiment.

It should be understood that the terminal device 600 or the terminal device 800 according to this embodiment of this application may correspond to the terminal device in the method embodiments of this application, and operations and/or functions of modules in the terminal device 600 or the terminal device 800 are separately intended to implement corresponding procedures of the methods in the foregoing method embodiments. For brevity, details are not described herein again.

Figure 17:
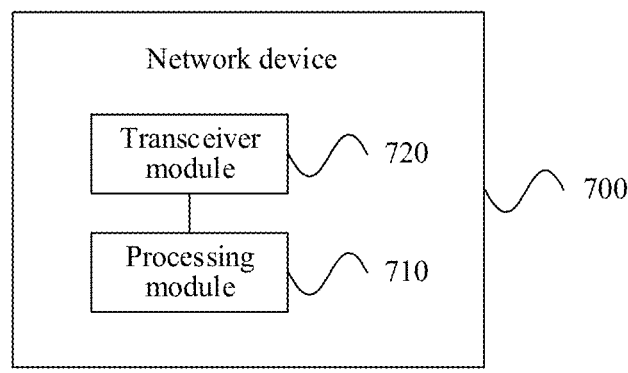
FIG. 17 is a schematic block diagram of a network device according to an embodiment of this application.

FIG. 17 is a schematic block diagram of a network device according to an embodiment of this application. The network device 700 in this embodiment includes:

a processing module 710, configured to obtain a correspondence, where the correspondence is a correspondence between N measurement gap configurations and N reference signal groups, one or more reference signals included in the reference signal group occupy a same time domain resource, the N reference signal groups are in a one-to-one correspondence with the N measurement gap configurations, and N is an integer greater than 1; and a transceiver module 720, configured to send the correspondence to a terminal device, where one first measurement gap configuration in the N measurement gap configurations is used by the terminal device to measure one or more reference signals included in a first reference signal group corresponding to the first measurement gap configuration.

In this application, the network device obtains the correspondence between the N measurement gap configurations and the N reference signal groups, and sends the correspondence to the terminal device. In this way, the terminal device can obtain, based on a measurement gap configuration corresponding to a reference signal that occupies a specific time domain resource, a measurement gap for measuring the reference signal that occupies the time domain resource, so that reference signals that need to be measured by the terminal device and that occupy time domain resources can be measured. This avoids a technical problem in the conventional technology that a part of reference signals cannot be measured because the terminal device can measure a reference signal only in one measurement gap in frequency domain.

Optionally, in an embodiment, the one or more reference signals included in the reference signal group are used for a same measurement purpose and/or are of a same type.

Optionally, in an embodiment, the processing module 710 is configured to: receive a configuration request from the terminal device, where the configuration request is used to indicate to configure different measurement gap configurations for reference signals that occupy different time domain resources; and obtain the correspondence based on the configuration request.

Optionally, when the one or more reference signals included in the reference signal group are used for the same measurement purpose, the configuration request is further used to indicate to configure different measurement gap configurations for reference signals that are used for different measurement purposes.

Optionally, when the one or more reference signals included in the reference signal group are of the same type, the configuration request is further used to indicate to configure different measurement gap configurations for reference signals of different types.

Optionally, in an embodiment, the processing module 710 is configured to:

obtain the N reference signal groups;

for one first reference signal group in the N reference signal groups, obtain a measurement gap configuration of the first reference signal group based on the first reference signal group; and generate the correspondence based on each reference signal group and the measurement gap configuration corresponding to each reference signal group.

Optionally, in an embodiment, when the reference signals included in the N reference signal groups occupy a same time domain resource, the processing module 710 is configured to: determine that reference signals that occupy a same time domain resource and that are in the reference signals that need to be measured by the terminal device are a group of reference signals in the N reference signal groups; or for one first frequency in frequencies corresponding to the reference signals that need to be measured by the terminal device, determine that reference signals that correspond to the first frequency and that occupy a same time domain resource are one of the N reference signal groups; or for one first cell in cells corresponding to the reference signals that need to be measured by the terminal device, determine that reference signals that correspond to the first cell and that occupy a same time domain resource are one of the N reference signal groups.

Optionally, in an embodiment, when the reference signals included in the N reference signal groups occupy a same time domain resource and are used for a same measurement purpose, the processing module 710 is configured to: determine that reference signals that occupy a same time domain resource and are used for a same measurement purpose and that are in the reference signals that need to be measured by the terminal device are a group of reference signals in the N reference signal groups; or for one first frequency in frequencies corresponding to the reference signals that need to be measured by the terminal device, determine that reference signals that correspond to the first frequency and that occupy a same time domain resource and are used for a same measurement purpose are one of the N reference signal groups; or for one first cell in cells corresponding to the reference signals that need to be measured by the terminal device, determine that reference signals that correspond to the first cell and that occupy a same time domain resource and are used for a same measurement purpose are one of the N reference signal groups.

Optionally, in an embodiment, when the reference signals included in the N reference signal groups occupy a same time domain resource, are used for a same measurement purpose, and are of a same type, the processing module 710 is configured to: determine that reference signals that are of a same type, occupy a same time domain resource, and are used for a same measurement purpose and that are in the reference signals that need to be measured by the terminal device are a group of reference signals in the N reference signal groups; or for one first frequency in frequencies corresponding to the reference signals that need to be measured by the terminal device, determine that reference signals that correspond to the first frequency and that are of a same type, occupy a same time domain resource, and are used for a same measurement purpose are one of the N reference signal groups; or for one first cell in cells corresponding to the reference signals that need to be measured by the terminal device, determine that reference signals that correspond to the first cell and that are of a same type, occupy a same time domain resource, and are used for a same measurement purpose are one of the N reference signal groups.

Optionally, in an embodiment, the processing module 710 is configured to receive grouping information from a core network device, where the grouping information indicates the N reference signal groups.

Optionally, in an embodiment, the processing module 710 is further configured to obtain, based on the first measurement gap configuration and configuration information of the one or more reference signals included in the first reference signal group, a receiving time corresponding to the first measurement gap configuration; and the transceiver module 720 is further configured to receive a measurement result at the receiving time, where the measurement result is a measurement result obtained after the one or more reference signals included in the first reference signal group are measured.

It should be understood that the processing module 710 in this embodiment of this application may be implemented by a processor or a processor-related circuit component, and the transceiver module 720 may be implemented by a transceiver or a transceiver-related circuit component.

Figure 18:
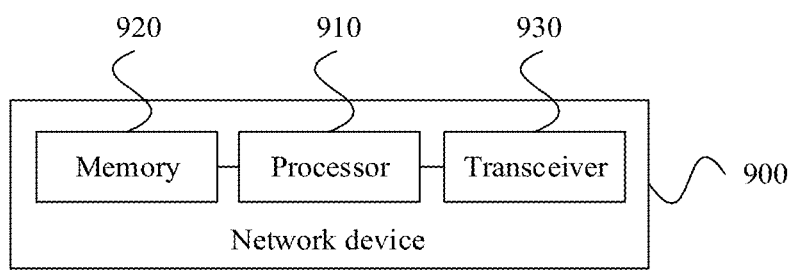
FIG. 18 is another schematic block diagram of a network device according to an embodiment of the present invention.

As shown in FIG. 18, an embodiment of this application further provides a network device 900. The network device 900 includes a processor 910, a memory 920, and a transceiver 930. The memory 920 stores instructions or a program, and the processor 910 is configured to execute the instructions or the program stored in the memory 920. When the instructions stored in the memory 920 are executed or the program stored in the memory 920 is executed, the processor 910 is configured to perform an operation performed by the processing module 710 in the foregoing embodiment, and the transceiver 930 is configured to perform an operation performed by the transceiver module 720 in the foregoing embodiment.

It should be understood that the network device 700 or the network device 900 according to this embodiment of this application may correspond to the network device in the method embodiments of this application, and operations and/or functions of modules in the network device 700 or the network device 900 are separately used to implement corresponding procedures of the methods in the method embodiments. For brevity, details are not described herein again.

An embodiment of this application further provides a communication apparatus, and the communication apparatus may be a terminal device or a circuit. The communication apparatus may be configured to perform an action performed by the terminal device in the foregoing method embodiments.

Figure 19:
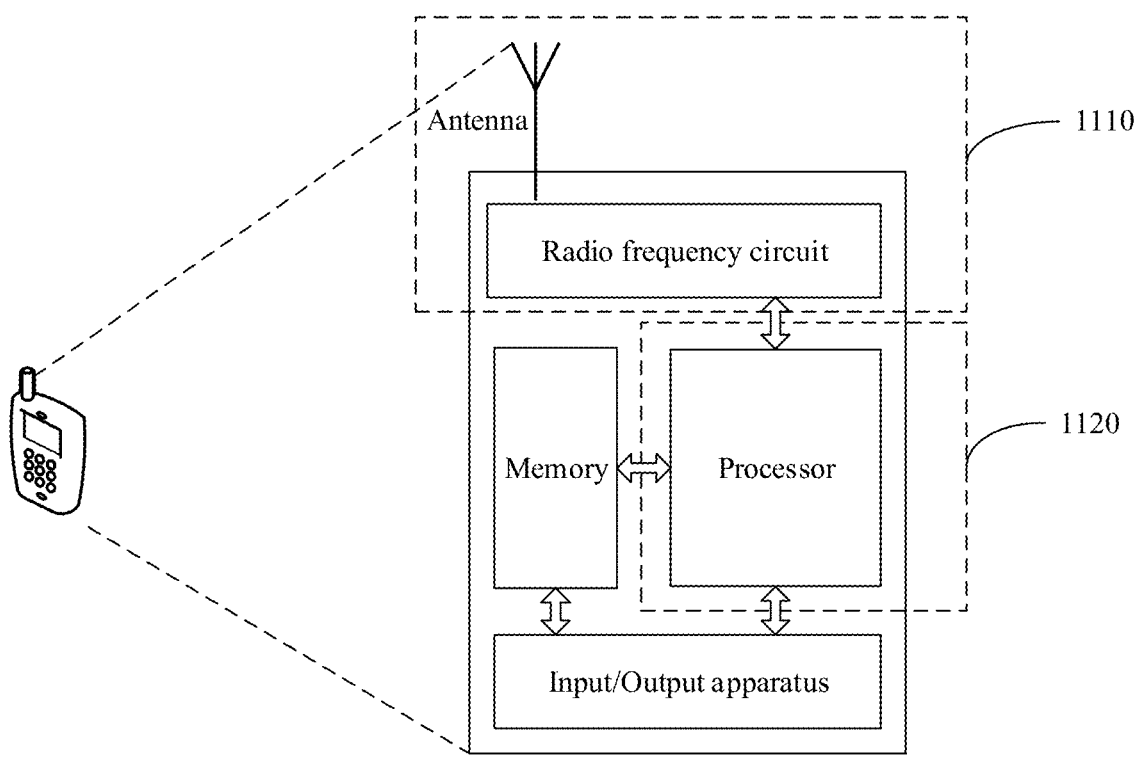
FIG. 19 is a schematic block diagram of a communication apparatus according to an embodiment of this application.

When the communication apparatus is a terminal device, FIG. 19 is a simplified schematic structural diagram of the terminal device. For ease of understanding and illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in a form of an electromagnetic wave. The input/output apparatus such as a touchscreen, a display, or a keyboard is mainly configured to: receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends the radio frequency signal to outside in the form of the electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 19. In an actual terminal device product, there may be one or more processors and one or more memories. The memory may also be referred to as a storage medium, a storage device, or the like. The memory may be disposed independent of the processor, or may be integrated into the processor. This is not limited in the embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 19, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1110 may be considered as a receiving unit, and a component for implementing a sending function in the transceiver unit 1110 may be considered as a sending unit. In other words, the transceiver unit 1110 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1110 is configured to perform the sending operation and the receiving operation on a terminal device side in the foregoing method embodiments, and the processing unit 1120 is configured to perform an operation other than the receiving operation and the sending operation of the terminal device in the foregoing method embodiments.

For example, in an embodiment, the transceiver unit 1110 is configured to perform a receiving operation and a sending operation on the terminal device side in operation 103 in FIG. 3, and/or the transceiver unit 1110 is further configured to perform other sending and receiving operations on the terminal device side in the embodiments of this application. The processing unit 1120 is configured to perform operation 103 in FIG. 3, and/or the processing unit 1120 is further configured to perform another processing operation on the terminal device side in the embodiments of this application.

For another example, in another implementation, the transceiver unit 1110 is configured to perform a receiving operation and a sending operation on the terminal device side in operation 203 in FIG. 7, and/or the transceiver unit 1110 is further configured to perform other sending and receiving operations on the terminal device side in the embodiments of this application. The processing unit 1120 is configured to perform operation 203 in FIG. 7, and/or the processing unit 1120 is further configured to perform another processing operation on the terminal device side in the embodiments of this application.

For still another example, in still another implementation, the transceiver unit 1110 is configured to perform a receiving operation and a sending operation on the terminal device side in operation 303 in FIG. 11, and/or the transceiver unit 1110 is further configured to perform other sending and receiving operations on the terminal device side in the embodiments of this application. The processing unit 1120 is configured to perform operation 303 in FIG. 11, and/or the processing unit 1120 is further configured to perform another processing operation on the terminal device side in the embodiments of this application.

For still another example, in still another implementation, the transceiver unit 1110 is configured to perform a receiving operation and a sending operation on the terminal device side in operation 403 in FIG. 12, and/or the transceiver unit 1110 is further configured to perform other sending and receiving operations on the terminal device side in the embodiments of this application. The processing unit 1120 is configured to perform operation 403 in FIG. 12, and/or the processing unit 1120 is further configured to perform another processing operation on the terminal device side in the embodiments of this application.

For still another example, in still another implementation, the transceiver unit 1110 is configured to perform a receiving operation and a sending operation on the terminal device side in operation S03 in FIG. 13, and/or the transceiver unit 1110 is further configured to perform other sending and receiving operations on the terminal device side in the embodiments of this application. The processing unit 1120 is configured to perform operation S03 in FIG. 13, and/or the processing unit 1120 is further configured to perform another processing operation on the terminal device side in the embodiments of this application.

For still another example, in still another implementation, the transceiver unit 1110 is configured to perform a receiving operation and a sending operation on the terminal device side in operation 603 in FIG. 14, and/or the transceiver unit 1110 is further configured to perform other sending and receiving operations on the terminal device side in the embodiments of this application. The processing unit 1120 is configured to perform operation 603 in FIG. 14, and/or the processing unit 1120 is further configured to perform another processing operation on the terminal device side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 20:
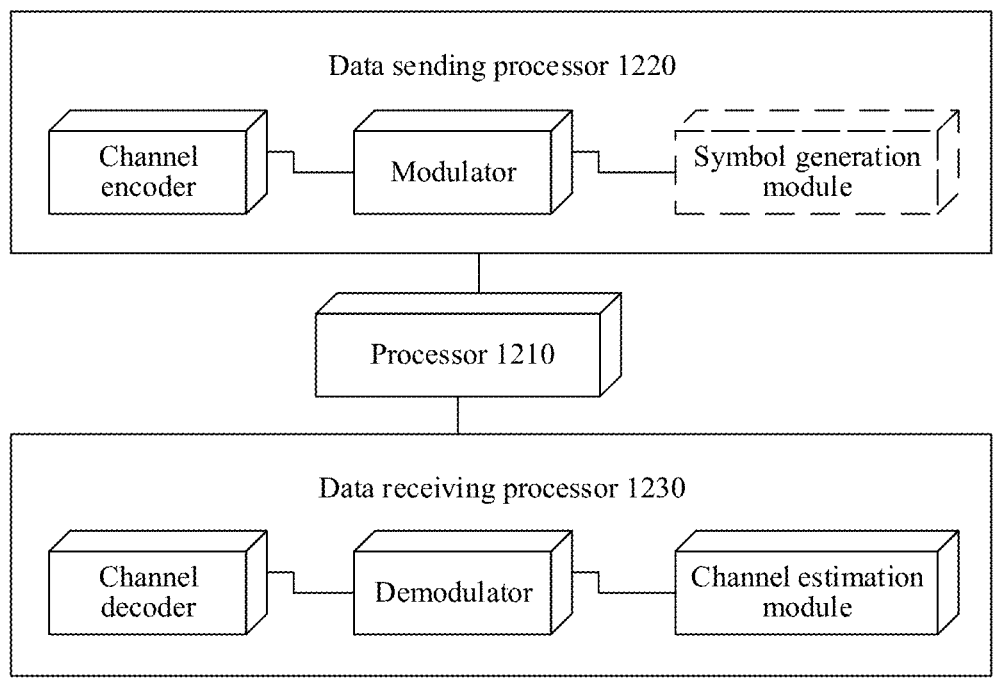
FIG. 20 is another schematic block diagram of a communication apparatus according to an embodiment of this application.

When the communication apparatus in this embodiment is a terminal device, refer to a device shown in FIG. 20. In an example, the device can implement a function similar to that of the processor 810 in FIG. 16. In FIG. 20, the device includes a processor 1210, a data sending processor 1220, and a data receiving processor 1230. The processing module 620 in the foregoing embodiment may be the processor 1210 in FIG. 20, and implements a corresponding function. The transceiver module 610 in the foregoing embodiment may be the data sending processor 1220 and/or the data receiving processor 1230 in FIG. 12. Although FIG. 20 shows a channel encoder and a channel decoder, it may be understood that these modules do not constitute a limitation on this embodiment and are merely examples.

Figure 21:
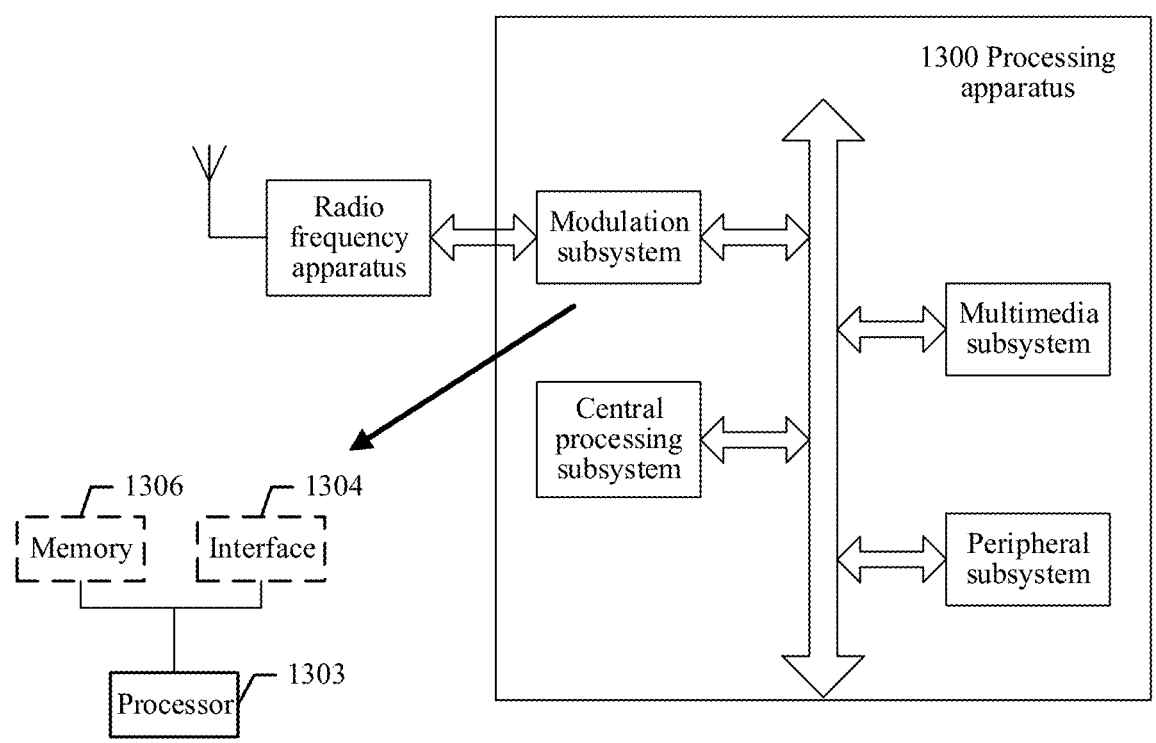
FIG. 21 is still another schematic block diagram of a communication apparatus according to an embodiment of this application.

FIG. 21 shows another form of this embodiment. A processing apparatus 1300 includes modules such as a modulation subsystem, a central processing subsystem, and a peripheral subsystem. The communication apparatus in the embodiments may be used as the modulation subsystem in the processing apparatus. The modulation subsystem may include a processor 1303 and an interface 1304. The processor 1303 implements a function of the processing module 620, and the interface 1304 implements a function of the transceiver module 610. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a nonvolatile memory, or may be a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores instructions. When the instructions are executed, the method on the terminal device side in the foregoing method embodiments is performed.

Figure 22:
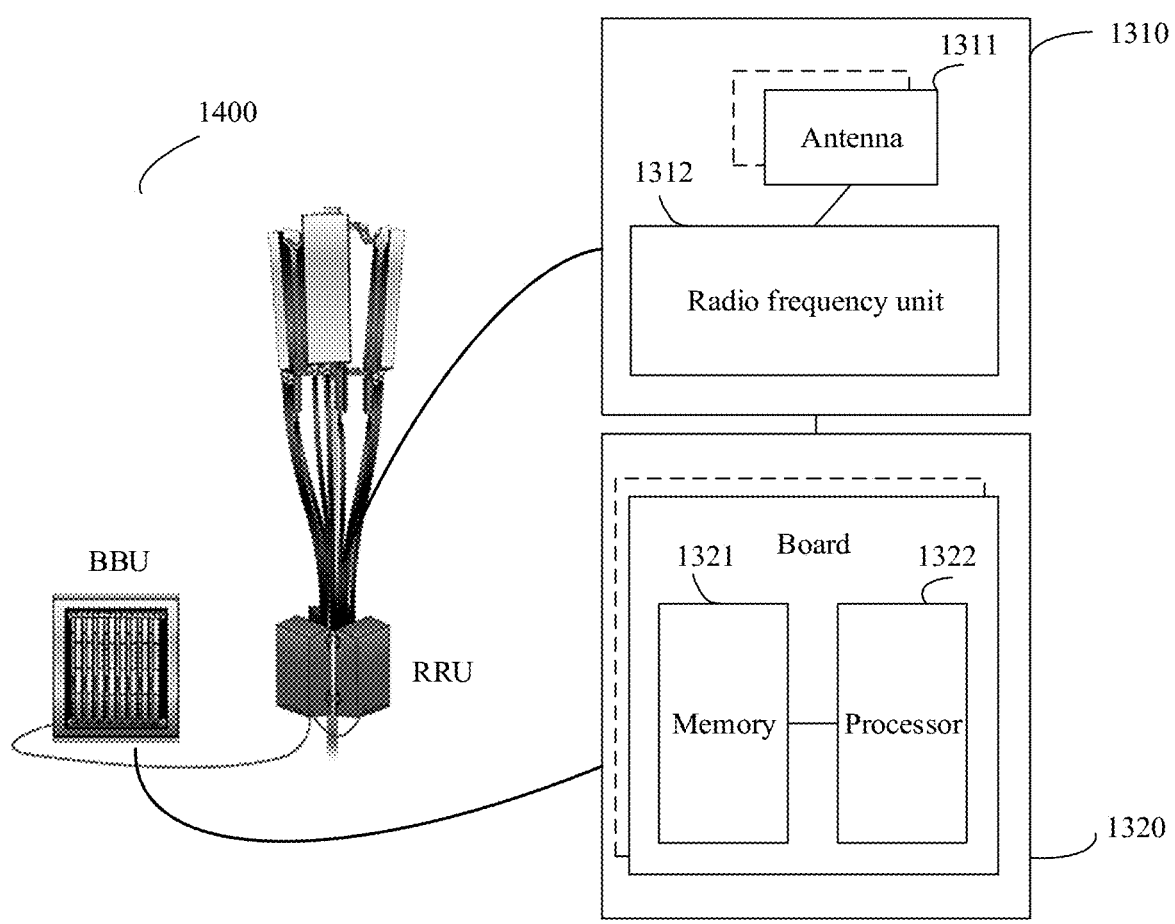
FIG. 22 is still another schematic block diagram of a communication apparatus according to an embodiment of this application.

When the apparatus in this embodiment is a network device, the network device may be shown in FIG. 22. An apparatus 1400 includes one or more radio frequency units, such as a remote radio unit (RRU) 1310 and one or more baseband units (BBU) (DUs) 1320. The RRU 1310 may be referred to as a transceiver module, and corresponds to the transceiver module 720 in FIG. 17. Optionally, the transceiver module may also be referred to as a transceiver machine, a transceiver circuit, a transceiver, or the like, and may include at least one antenna 1311 and a radio frequency unit 1312. The RRU 1310 is mainly configured to: send and receive a radio frequency signal, and perform conversion between the radio frequency signal and a baseband signal. For example, the RRU 1310 is configured to send indication information to a terminal device. The BBU 1320 is mainly configured to: perform baseband processing, control the base station, and so on. The RRU 1310 and the BBU 1320 may be physically disposed together, or may be physically separate, that is, in a distributed base station.

The BBU 1320 is a control center of the base station, and may also be referred to as a processing module. The BBU 1320 may correspond to the processing module 710 in FIG. 17, and is mainly configured to implement a baseband processing function such as channel coding, multiplexing, modulation, or spreading. For example, the BBU (a processing module) may be configured to control the base station to perform an operation procedure related to the network device in the foregoing method embodiments, for example, generate the foregoing indication information.

In an example, the BBU 1320 may include one or more boards, and a plurality of boards may jointly support a radio access network (for example, an LTE network) having a single access standard, or may separately support radio access networks (for example, an LTE network, a 5G network, or another network) having different access standards. The BBU 1320 further includes a memory 1321 and a processor 1322. The memory 1321 is configured to store necessary instructions and necessary data. The processor 1322 is configured to control the base station to perform a necessary action, for example, is configured to control the base station to perform an operation procedure related to the network device in the foregoing method embodiments. The memory 1321 and the processor 1322 may serve the one or more boards. In other words, a memory and a processor may be independently disposed on each board. Alternatively, a plurality of boards may share a same memory and a same processor. In addition, a necessary circuit may be further disposed on each board.

In another form of this embodiment, a computer-readable storage medium is provided. The computer-readable storage medium stores instructions. When the instructions are executed, the method on the network device side in the foregoing method embodiments is performed.

It should be understood that, the processor mentioned in this embodiment of this application may be a central processing unit (CPU), or another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another proper type.

It should further be understood that "first", "second", "third", "fourth", and various numbers in this specification are merely used for differentiation for ease of description, and are not construed as a limitation to the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not indicate an execution sequence. The execution sequence of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the disclosure provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of communications, comprising:
   sending a configuration request to a network device, wherein the configuration request indicates to configure different measurement gap configurations for reference signals that occupy different time domain resources;
   in response to sending the configuration request, receiving, from the network device, a correspondence between N measurement gap configurations and N reference signal groups, wherein one or more reference signals comprised in a reference signal group of the N reference signal groups occupy a same time domain resource and are used for a same measurement purpose, wherein the N reference signal groups are in a one-to-one correspondence with the N measurement gap configurations, wherein N is an integer greater than 1, and wherein, when the one or more reference signals comprised in the reference signal group are used for the same measurement purpose, the configuration request further indicates configuring different measurement gap configurations for reference signals that are used for different measurement purposes; and
   for a first measurement gap configuration in the N measurement gap configurations, measuring, based on the first measurement gap configuration, one or more reference signals comprised in a first reference signal group corresponding to the first measurement gap configuration.

2. The method according to claim 1, wherein the one or more reference signals comprised in the reference signal group are of a same type.

3. The method according to claim 1, wherein the one or more reference signals comprised in the reference signal group correspond to one of a same frequency, a same cell, a plurality of cells, or a plurality of frequencies.

4. The method according to claim 1, wherein
   when the one or more reference signals comprised in the reference signal group are of the same type, the configuration request further indicate configuring different measurement gap configurations for reference signals of different types.

5. The method according to claim 1, further comprising:
   obtaining, based on the first measurement gap configuration and configuration information of the one or more reference signals comprised in the first reference signal group, a reporting time corresponding to the first measurement gap configuration; and
   sending a measurement result to the network device at the reporting time, wherein the measurement result is obtained after the one or more reference signals comprised in the first reference signal group are measured.

6. A communication method, comprising:
   receiving a configuration request from a terminal device, wherein the configuration request indicates to configure different measurement gap configurations for reference signals that occupy different time domain resources;
   in response to sending the configuration request, obtaining a correspondence between N measurement gap configurations and N reference signal groups, wherein one or more reference signals comprised in a reference signal group of the N reference signal groups occupy a same time domain resource and are used for a same measurement purpose, wherein the N reference signal groups are in a one-to-one correspondence with the N measurement gap configurations, wherein N is an integer greater than 1, and wherein, when the one or more reference signals comprised in the reference signal group are used for the same measurement purpose, the configuration request further indicates configuring different measurement gap configurations for reference signals that are used for different measurement purposes; and sending the correspondence to the terminal device, wherein a first measurement gap configuration in the N measurement gap configurations is used by the terminal device to measure one or more reference signals comprised in a first reference signal group corresponding to the first measurement gap configuration.

7. The method according to claim 6, wherein the one or more reference signals comprised in the reference signal group are of a same type.

8. The method according to claim 7, further comprising:
obtaining, based on the first measurement gap configuration and configuration information of the one or more reference signals comprised in the first reference signal group, a receiving time corresponding to the first measurement gap configuration; and
receiving a measurement result at the receiving time, wherein the measurement result is obtained after the one or more reference signals comprised in the first reference signal group are measured.

9. The method according to claim 6, wherein the obtaining the correspondence comprises:
receiving a configuration request from the terminal device, wherein the configuration request indicates configure different measurement gap configurations for reference signals that occupy different time domain resources; and
obtaining the correspondence based on the configuration request.

10. The method according to claim 9, wherein
when the one or more reference signals comprised in the reference signal group are of the same type, the configuration request further indicate configuring different measurement gap configurations for reference signals of different types.

11. The method according to claim 6, wherein the obtaining the correspondence comprises:
obtaining the N reference signal groups;
for a first reference signal group in the N reference signal groups, obtaining a measurement gap configuration of the first reference signal group based on the first reference signal group; and
generating the correspondence based on each reference signal group and the measurement gap configuration corresponding to each reference signal group.

12. The method according to claim 11, wherein when the reference signals comprised in the N reference signal groups occupy a same time domain resource, the obtaining the N reference signal groups comprises:
determining that reference signals that occupy a same time domain resource and that are in reference signals that need to be measured by the terminal device are a group of reference signals in the N reference signal groups; or
for a first frequency in frequencies corresponding to reference signals that need to be measured by the terminal device, determining that reference signals that correspond to the first frequency and that occupy a same time domain resource are one of the N reference signal groups; or for a first cell in cells corresponding to reference signals that need to be measured by the terminal device, determining that reference signals that correspond to the first cell and that occupy a same time domain resource are one of the N reference signal groups.

13. The method according to claim 11, wherein the obtaining the N reference signal groups comprises:
receiving grouping information from a core network device, wherein the grouping information indicates the N reference signal groups.

14. A device, comprising:
a processor; and
a memory, wherein the memory stores execution instructions, which, when executed by the processor cause the device to perform operations comprising:
sending a configuration request to a network device, wherein the configuration request indicates to configure different measurement gap configurations for reference signals that occupy different time domain resources;
in response to sending the configuration request, receiving a correspondence from the network device, wherein the correspondence is a correspondence between N measurement gap configurations and N reference signal groups, wherein one or more reference signals comprised in a reference signal group of the N reference signal groups occupy a same time domain resource and are used for a same measurement purpose, wherein the N reference signal groups are in a one-to-one correspondence with the N measurement gap configurations, wherein N is an integer greater than 1, and wherein, when the one or more reference signals comprised in the reference signal group are used for the same measurement purpose, the configuration request further indicates configuring different measurement gap configurations for reference signals that are used for different measurement purposes; and
for a first measurement gap configuration in the N measurement gap configurations, measuring, based on the first measurement gap configuration, one or more reference signals comprised in a first reference signal group corresponding to the first measurement gap configuration.

15. The device according to claim 14, wherein the one or more reference signals comprised in the reference signal group are of a same type.

16. The device according to claim 14, wherein the one or more reference signals comprised in the reference signal group correspond to one of a same frequency, a same cell, a plurality of cells, or a plurality of frequencies.

17. The device according to claim 14, wherein when the one or more reference signals comprised in the reference signal group are of the same type, the configuration request further indicate configuring different measurement gap configurations for reference signals of different types.

18. The device according to claim 14, wherein the device performs further operations comprising:
obtaining, based on the first measurement gap configuration and configuration information of the one or more reference signals comprised in the first reference signal group, a reporting time corresponding to the first measurement gap configuration; and
sending a measurement result to the network device at the reporting time, wherein the measurement result is obtained after the one or more reference signals comprised in the first reference signal group are measured.

* * * * *